United States Patent
He et al.

(10) Patent No.: US 12,245,177 B2
(45) Date of Patent: Mar. 4, 2025

(54) METHODS AND SYSTEMS FOR DOWNLINK TRANSMISSION AND INTERLACE UPLINK TRANSMISSION

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Jie Cui, San Jose, CA (US); Oghenekome Oteri, San Diego, CA (US); Pengkai Zhao, Cupertino, CA (US); Wei Zeng, Saratago, CA (US); Wei Zhang, Santa Clara, CA (US); Weidong Yang, San Diego, CA (US); Yang Tang, San Jose, CA (US); Yuchul Kim, San Jose, CA (US); Yushu Zhang, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/439,674

(22) PCT Filed: May 14, 2020

(86) PCT No.: PCT/CN2020/090130
§ 371 (c)(1),
(2) Date: Sep. 15, 2021

(87) PCT Pub. No.: WO2021/226901
PCT Pub. Date: Nov. 18, 2021

(65) Prior Publication Data
US 2023/0073001 A1    Mar. 9, 2023

(51) Int. Cl.
*H04W 72/04* (2023.01)
*H04W 56/00* (2009.01)
*H04W 74/0808* (2024.01)

(52) U.S. Cl.
CPC ....... *H04W 56/0015* (2013.01); *H04W 72/04* (2013.01); *H04W 74/0808* (2013.01)

(58) Field of Classification Search
CPC ......... H04W 74/0808; H04W 56/0015; H04W 72/04
See application file for complete search history.

(56) References Cited

U.S. PATENT DOCUMENTS 10,708,938 B2    7/2020  Papasakellariou
2012/0250663 A1  10/2012 Han et al.
(Continued)

FOREIGN PATENT DOCUMENTS

CN    109923824 A    6/2019
CN    110235477 A1   9/2019
(Continued)

OTHER PUBLICATIONS

Sharp "UL signals and channels for NR-U", R1-1910928, 3rd Generation Partnership Project (3GPP), Mobile Competence Centre ; 650, Route Des Lucioles ; F-06921 Sophia-Antipolis Cedex; France, vol. RAN WG1, No. 98b, Chongqing, China; Oct. 14, 2019; 11 pages.
(Continued)

*Primary Examiner* — James P Duffy
(74) *Attorney, Agent, or Firm* — Sterne, Kessler, Goldstein & Fox PLLC

(57) ABSTRACT

Some aspects of this disclosure relate to apparatuses and methods for implementing downlink transmission and interlace uplink transmission. For example, some aspects of this disclosure relate to a base station including a transceiver
(Continued)

configured to communicate over a wireless network with a user equipment (UE) and a processor communicatively coupled to the transceiver. The processor divides a plurality of candidate Synchronization Signal Block (SSB) positions in a time window into a plurality of groups and communicates, using the transceiver, information associated with the plurality of groups of candidate SSB positions to the UE. The processor further performs a listen-before-talk (LBT) procedure. In response to the LBT procedure being successful, the processor determines a first group of the plurality of groups and transmits, using the transceiver, one or more SSBs on one or more candidate SSB positions of the first group to the UE.

20 Claims, 12 Drawing Sheets

(56) References Cited

U.S. PATENT DOCUMENTS

| | | | |
|---|---|---|---|
| 2014/0321422 A1 | 10/2014 | Choi et al. | |
| 2016/0174214 A1* | 6/2016 | Yerramalli | H04W 76/27 370/329 |
| 2016/0192354 A1* | 6/2016 | Wei | H04W 72/0446 370/329 |
| 2019/0274187 A1* | 9/2019 | Urabayashi | H04W 72/0453 |
| 2019/0313350 A1 | 10/2019 | Zhang et al. | |
| 2019/0349885 A1* | 11/2019 | Koskela | H04W 24/08 |
| 2020/0037230 A1 | 1/2020 | Chen et al. | |
| 2021/0243710 A1 | 8/2021 | Tang | |
| 2021/0329676 A1 | 10/2021 | Yang et al. | |
| 2022/0150927 A1* | 5/2022 | Shin | H04L 5/0053 |
| 2022/0217660 A1 | 7/2022 | Liu | |
| 2023/0073001 A1* | 3/2023 | He | H04W 56/0015 |

FOREIGN PATENT DOCUMENTS

| | | |
|---|---|---|
| KR | 20110055367 A | 5/2011 |
| WO | WO 2013048070 A1 | 4/2013 |
| WO | WO 2019160331 A1 | 8/2019 |
| WO | WO 2019184574 A1 | 10/2019 |
| WO | WO 2020/032558 A1 | 2/2020 |
| WO | WO 2020082395 A1 | 4/2020 |

OTHER PUBLICATIONS

Extended European Search Report directed to related European Patent Application No. 20934964.6, mailed Feb. 16, 2024; 15 pages.
Communication pursuant to Rule 164(1) EPC directed to related European Application No. 20934964.6, mailed Nov. 7, 2023; 15 pages.
Xiaomi, "NR-U initial access procedure enhancements," 3GPP TSG RAN WG1 #96bis Apr. 8, 2019-Apr. 12, 2019, R1-1905074, retrieved on Mar. 29, 2019 from the internet, URL:http://www.3gpp.org/ftp/tsg%5Fran/WG1%5FRL1/TSGR1%5F96b/Docs/R1%2D1905074%2Ezip, XP051691979; 4 pages.
3GPP TS 38.211 V16.1.0, 3rd Generation Partnership Project; Technical Specification Group Radio Access Network; NR; Physical channels and modulation (Release 16), Mar. 2020; 130 pages.
3GPP TS 38.213 V16.1.0, 3rd Generation Partnership Project; Technical Specification Group Radio Access Network; NR; Physical layer procedures for control (Release 16), Mar. 2020; 156 pages.
International Search Report and Written Opinion directed to related International Application No. PCT/CN2020/090130, mailed on Feb. 19, 2021, 8 pages.
Qualcomm Incorporated, "Agreements in NR-U WI up to RAN1 #98," 3GPP TSG RAN WG1 Meeting #98bis, R1-1909920, Oct. 20, 2019 (Oct. 20, 2019), 19 pages.
LG Electronics, "Remaining issues of initial access and mobility for NR-U," 3GPP TSG RAN WG1 #100, R1-2000664, Mar. 6, 2020 (Mar. 6, 2020), 4 pages.
Xiaomi, "SSB transmission in NRU initial access," 3GPP TSG RAN WG1 Meeting #95, R1-1813363, Nov. 16, 2018 (Nov. 16, 2018), 3 pages.
Samsung, "Uplink signal and channel design for NR-U," 3GPP TSG RAN WG1 #96bis, R1-1904405, Apr. 12, 2019 (Apr. 12, 2019), 6 pages.
Ericsson, "Enhancements to initial access procedure," 3GPP TSG-RAN WG1 Meeting #97, R1-1907455, May 17, 2019 (May 17, 2019), 15 pages.
Extended European Search Report directed to European Application No. 24201225.0, mailed Dec. 23, 2024; 10 pages.
InterDigital Inc., "Design aspects of NR-U uplink signals and channels," 3GPP TSG RAN WG1 Meeting #95, R1-1813219 Spokane, USA, Nov. 12-16, 2018; 14 pages.
Notice of Grant and Search Report directed to related Chinese Application No. 202080100848.5, with machine translation attached, mailed Jan. 9, 2025; 6 pages.

* cited by examiner

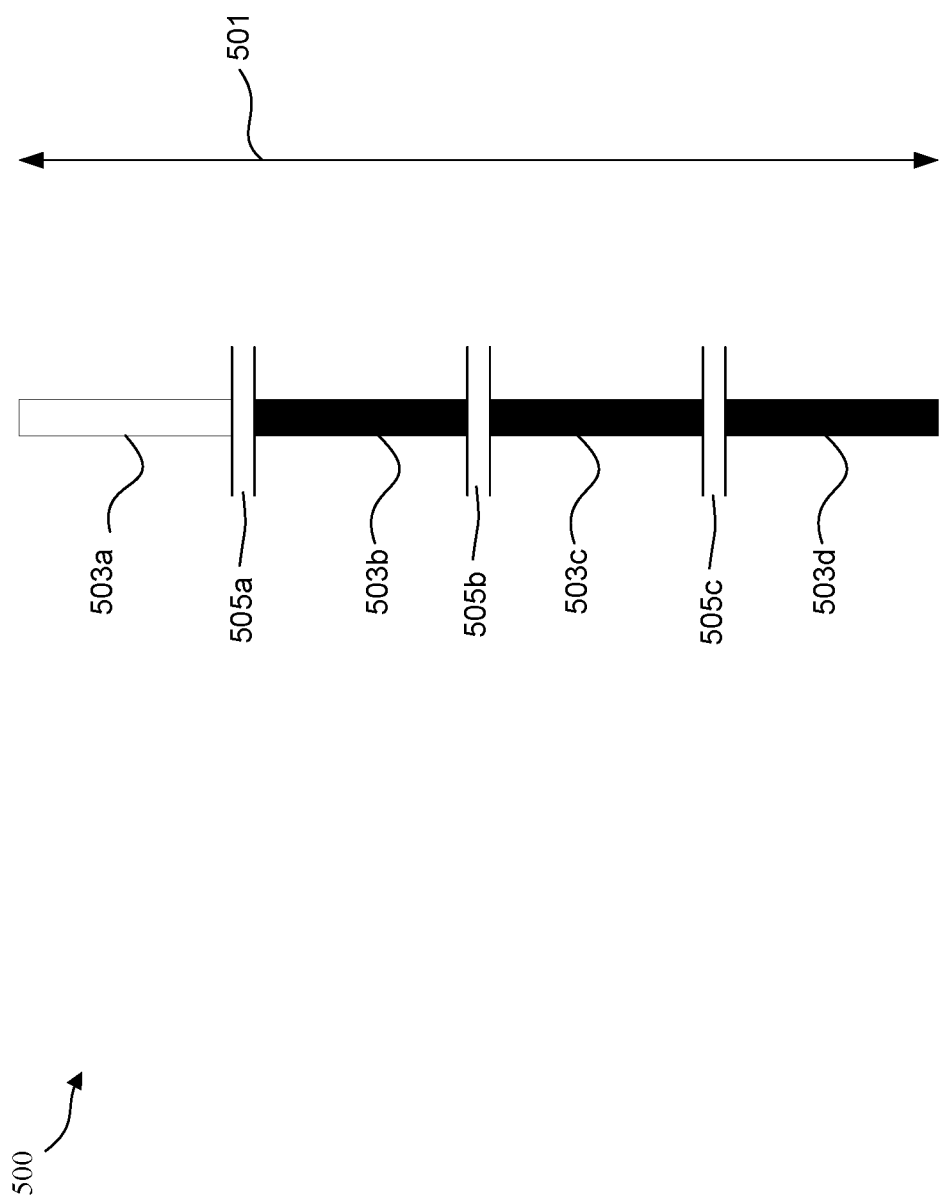

METHODS AND SYSTEMS FOR DOWNLINK TRANSMISSION AND INTERLACE UPLINK TRANSMISSION

This application is a U.S. National Phase of International Application No. PCT/CN2020/090130, filed May 14, 2020, which is hereby incorporated by reference in its entirety.

BACKGROUND

Field

The described aspects generally relate downlink transmission and interlace uplink transmission in wireless communications. For example, some aspects of this disclosure relate to designs for resource mapping for operation with shared spectrum channel access. Some aspects of this disclosure relate to designs for resource allocation for interlace uplink transmissions.

Background

A user equipment (UE) communicating with a base station (for example, an evolved Node B (eNB), a next generation Node B (gNB)) over a communication link can use an uplink control channel to transmit control and measurement information to the base station and can use an uplink data channel to transmit data to the base station. The base station can use a downlink control channel to transmit control information to the UE on how to use resources on the uplink channel(s).

SUMMARY

Some aspects of this disclosure relate to apparatuses and methods for implementing downlink transmission and interlace uplink transmission for 3rd Generation Partnership Project (3GPP) release 15 (Rel-15), release 16 (Rel-16), Rel-16 New Radio (NR), and/or Rel-16 NR-U (New Radio Unlicensed).

Some aspects of this disclosure relate to a base station. The base station includes a transceiver configured to communicate over a wireless network with a user equipment (UE) and a processor communicatively coupled to the transceiver. The processor divides a plurality of candidate Synchronization Signal Block (SSB) positions in a time window into a plurality of groups and communicates, using the transceiver, information associated with the plurality of groups of candidate SSB positions to the UE. The processor further performs a listen-before-talk (LBT) procedure. In response to the LBT procedure being successful, the processor determines a first group of the plurality of groups and transmits, using the transceiver, one or more SSBs on one or more candidate SSB positions of the first group to the UE.

In some examples, the processor is configured to communicate, using the transceiver, the information associated with the plurality of groups of candidate SSB positions to the UE using at least one of a Master Information Block (MIB), a payload of a Physical Broadcast Channel (PBCH), or a System Information Block 1 (SIB1).

In some examples, the processor is configured to communicate, using the transceiver, the information associated with the plurality of groups of candidate SSB positions to the UE using ssb-PositionsInBurst information element (IE) in the SIB1. In some examples, each bit in the ssb-PositionsInBurst IE corresponds to one of the plurality of groups.

In some examples, the processor is configured to transmit, using the transceiver, the one or more SSBs on the one or more candidate SSB positions of the first group during a Discovery Reference Signal (DRS) window.

In some examples, the information associated with the plurality of groups of candidate SSB positions comprises a parameter and a number of the plurality of candidate SSB positions. In some examples, the number of the plurality of candidate SSB positions is 20.

Some aspects of this disclosure relate to a method. The method includes dividing a plurality of candidate Synchronization Signal Block (SSB) positions in a time window into a plurality of groups and communicating information associated with the plurality of groups of candidate SSB positions to a user equipment (UE). The method further includes performing a listen-before-talk (LBT) procedure. In response to the LBT procedure being successful, the method includes determining a first group of the plurality of groups and transmitting one or more SSBs on one or more candidate SSB positions of the first group to the UE.

Some aspects of this disclosure relate to a non-transitory computer-readable medium storing instructions. When the instructions are executed by a processor of a base station, the instructions cause the processor to perform operations including dividing a plurality of candidate Synchronization Signal Block (SSB) positions in a time window into a plurality of groups and communicating information associated with the plurality of groups of candidate SSB positions to a user equipment (UE). The operations further include performing a listen-before-talk (LBT) procedure. In response to the LBT procedure being successful, the operations include determining a first group of the plurality of groups and transmitting one or more SSBs on one or more candidate SSB positions of the first group to the UE.

Some aspects of this disclosure relate to a user equipment (UE). The UE includes a transceiver configured to communicate over a wireless network with a base station and a processor communicatively coupled to the transceiver. The processor receives, using the transceiver and from the base station, information associated with a plurality of groups of candidate Synchronization Signal Block (SSB) positions. The processor further receives, using the transceiver and from the base station, an SSB at a first group of candidate SSB positions and determine that the first group of candidate SSB positions is used for receiving SSBs.

Some aspects of this disclosure relate to a method. The method includes receiving, from a base station, information associated with a plurality of groups of candidate Synchronization Signal Block (SSB) positions. The method further includes receiving, from the base station, an SSB at a first group of candidate SSB positions and determining that the first group of candidate SSB positions is used for receiving SSBs.

Some aspects of this disclosure relate to a non-transitory computer-readable medium storing instructions. When the instructions are executed by a processor of a user equipment (UE), the instructions cause the processor to perform operations including receiving, from a base station, information associated with a plurality of groups of candidate Synchronization Signal Block (SSB) positions. The operations further include receiving, from the base station, an SSB at a first group of candidate SSB positions and determining that the first group of candidate SSB positions is used for receiving SSBs.

Some aspects of this disclosure relate to a base station. The base station includes a 25 transceiver configured to communicate over a wireless network with a user equipment (UE) and a processor communicatively coupled to the transceiver. The processor generates a Downlink Channel Indicator (DCI). The DCI includes interlace resource allocation information for a Physical Uplink Control Channel (PUCCH). The processor, using the transceiver, transmits the DCI to the UE.

In some examples, the interlace resource allocation information for the PUCCH includes a bitmap, where a first value of a bit of the bitmap indicates that a corresponding interlace is allocated for the PUCCH. In some examples, a size of the bitmap is based on a sub-carrier spacing of the PUCCH.

In some examples, the interlace resource allocation information includes a first interlace index and a second interlace index is calculated by the UE using the first interlace index. In some examples, the second interlace index is based on the first interlace index and a number of interlaces for a sub-carrier spacing of the PUCCH.

In some examples, the PUCCH is at least one of PUCCH Format 2 or PUCCH Format 3.

In some examples, the DCI further includes a mapping between Orthogonal Cover Code (OCC) index applied on an Uplink Control Information (UCI) symbol and a cyclic shift applied to a DeModulation Reference Signal (DMRS) symbol.

In some examples, the DCI further includes information for the UE to use a plurality of Orthogonal Cover Code (OCC) indices and to cycle the plurality of OCC indices across Physical Resource Blocks (PRBs) within an interlace.

In some examples, the DCI further includes information for the UE to apply a scrambling sequence per transmission to one or more symbols associated with the PUCCH.

In some examples, the processor is further configured to generate System Information Block 1 (SIB1), the SIB1 comprises a value configured to signal interlaced cell-specific PUCCH resource allocation to the UE.

Some aspects of this disclosure relate to a method. The method includes generating a Downlink Channel Indicator (DCI). The DCI includes interlace resource allocation information for a Physical Uplink Control Channel (PUCCH). The method further includes transmitting the DCI to the UE.

Some aspects of this disclosure relate to a non-transitory computer-readable medium storing instructions. When the instructions are executed by a processor of a base station, the instructions cause the processor to perform operations including generating a Downlink Channel Indicator (DCI). The DCI includes interlace resource allocation information for a Physical Uplink Control Channel (PUCCH). The operations further include transmitting the DCI to the UE.

Some aspects of this disclosure relate to a user equipment (UE). The UE includes a transceiver configured to communicate over a wireless network with a base station and a processor communicatively coupled to the transceiver. The processor receives, from a base station, a Downlink Channel Indicator (DCI). The DCI includes interlace resource allocation information for a Physical Uplink Control Channel (PUCCH). The processor further allocates resources on the PUCCH based on the interlace resource allocation information.

In some examples, the interlace resource allocation information for the PUCCH include a bitmap. A first value of a bit of the bitmap indicates that a corresponding interlace is allocated for the PUCCH.

In some examples, the interlace resource allocation information include a first interlace index. The processor is further configured to calculate a second interlace index using the first interlace index. In some examples, the processor is configured to calculate the second interlace index based on the first interlace index and a number of interlaces for a sub-carrier spacing of the PUCCH.

In some examples, the DCI further includes a mapping between Orthogonal Cover Code (OCC) index applied on an Uplink Control Information (UCI) symbol and a cyclic shift (CS) applied to a DeModulation Reference Signal (DMRS) symbol. In some examples, the processor is further configured to use the OCC Index to determine a CS index, generate the UCI symbol using the OCC index, and generate the DRMS symbol using the CS Index.

In some examples, the processor is further configured to determine a plurality of Orthogonal Cover Code (OCC) indices based on the received DCI and cycle the plurality of OCC indices across Physical Resource Blocks (PRBs) within an interlace.

In some examples, the processor is further configured to apply, based on the received DCI, a scrambling sequence per transmission to one or more symbols associated with the PUCCH.

In some examples, the processor is further configured to receive System Information Block 1 (SIB1), wherein the SIB1 comprises a value configured to signal interlaced cell-specific PUCCH resource allocation to the UE.

Some aspects of this disclosure relate to a method. The method includes receiving, from a base station, a Downlink Channel Indicator (DCI). The DCI includes interlace resource allocation information for a Physical Uplink Control Channel (PUCCH). The method further includes allocating resources on the PUCCH based on the interlace resource allocation information.

Some aspects of this disclosure relate to a non-transitory computer-readable medium storing instructions. When the instructions are executed by a processor of a user equipment, the instructions cause the processor to perform operations including receiving, from a base station, a Downlink Channel Indicator (DCI). The DCI includes interlace resource allocation information for a Physical Uplink Control Channel (PUCCH). The operations further include allocating resources on the PUCCH based on the interlace resource allocation information.

Some aspects of this disclosure relate to a base station. The base station includes a transceiver configured to communicate over a wireless network with a user equipment (UE) and a processor communicatively coupled to the transceiver. The processor generates a Downlink Channel Indicator (DCI). The DCI includes at least one of partial interlace resource allocation information for a Physical Uplink Shared Channel (PUSCH) or resource allocation type switching information for the PUSCH. The processor transmits, using the transceiver, the DCI to the UE.

In some examples, the DCI includes a field to indicate a starting listen-to-talk (LBT) bandwidth and a number of contagiously allocated LBT bandwidths. In some examples, the field in the DCI includes a resource indication value (RIV) determined based on the starting LBT bandwidth, the number of contagiously allocated LBT bandwidths, and a number of LBT sub-bands within a bandwidth part (BWP).

In some examples, the DCI includes an allocation pattern. In some examples, the allocation pattern includes a bitmap and a bit in the bitmap is set to a first value to indicate an LBT bandwidth not available for PUSCH transmission.

In some examples, a Most Significant Bit (MSB) of a frequency domain resource allocation (FDRA) field of the DCI includes the resource allocation type switching information. The MSB of the FDRA field of the DCI can be used to dynamically select one of two or more activated resource allocation schemes for PUSCH resource allocation at the UE.

In some examples, the DCI further includes a Resource Indication Value (RIV). A first set of values for the RIV indicate contiguous interlaces resource allocation (RA), and wherein a second set of values for the RIV indicate non-contiguous interlaces RA.

Some aspects of this disclosure relate to a method. The method includes generating a Downlink Channel Indicator (DCI). The DCI includes at least one of partial interlace resource allocation information for a Physical Uplink Shared Channel (PUSCH) or resource allocation type switching information for the PUSCH. The method further includes transmitting the DCI to the UE.

Some aspects of this disclosure relate to a non-transitory computer-readable medium storing instructions. When the instructions are executed by a processor of a base station, the instructions cause the processor to perform operations including generating a Downlink Channel Indicator (DCI). The DCI includes at least one of partial interlace resource allocation information for a Physical Uplink Shared Channel (PUSCH) or resource allocation type switching information for the PUSCH. The operations further include transmitting the DCI to the UE.

Some aspects of this disclosure relate to a user equipment (UE). The UE includes a transceiver configured to communicate over a wireless network with a base station and a processor communicatively coupled to the transceiver. The processor receives, using the transceiver and from a base station, a Downlink Channel Indicator (DCI). The DCI can include at least one of partial interlace resource allocation information for a Physical Uplink Shared Channel (PUSCH) or resource allocation type switching information for the PUSCH. The processor allocates resources for the partial interlace PUSCH based on the partial interlace resource allocation information. Additionally, or alternatively, the processor dynamically switches between PUSCH resource allocations based on the resource allocation type switching information.

Some aspects of this disclosure relate to a method. The method includes receiving, from a base station, a Downlink Channel Indicator (DCI). The DCI can include at least one of partial interlace resource allocation information for a Physical Uplink Shared Channel (PUSCH) or resource allocation type switching information for the PUSCH. The method further includes allocating resources for the partial interlace PUSCH based on the partial interlace resource allocation information. Additionally, or alternatively, the method includes dynamically switching between PUSCH resource allocations based on the resource allocation type switching information.

Some aspects of this disclosure relate to a non-transitory computer-readable medium storing instructions. When the instructions are executed by a processor of a user equipment (UE), the instructions cause the processor to perform operations including receiving, from a base station, a Downlink Channel Indicator (DCI). The DCI can include at least one of partial interlace resource allocation information for a Physical Uplink Shared Channel (PUSCH) or resource allocation type switching information for the PUSCH. The operations further include allocating resources for the partial interlace PUSCH based on the partial interlace resource allocation information. Additionally, or alternatively, the operations include dynamically switching between PUSCH resource allocations based on the resource allocation type switching information.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIG. 5 illustrates one exemplary partial interlace Physical Upload Shared Channel (PUSCH) resource allocation, according to some aspects of the disclosure.

Figure 1:
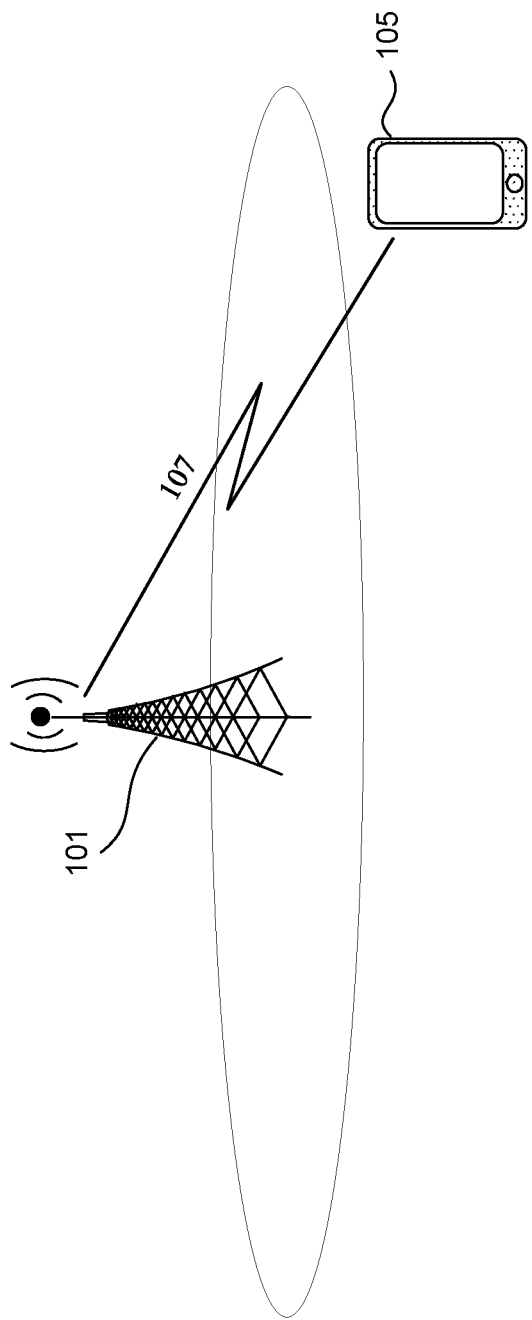
FIG. 1 illustrates an example system implementing designs for implementing downlink transmission and interlace uplink transmission, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing downlink transmission and interlace uplink transmission for 3GPP Rel-15. Rel New Radio (NR), Rel-16, Rel-16 NR, and/or Rel-16 NR-U (New Radio Unlicensed).

FIG. 1 illustrates an example system 100 implementing designs for implementing downlink transmission and interlace uplink transmission, according to some aspects of the disclosure. Example system 100 is provided for the purpose of illustration only and does not limit the disclosed aspects. System 100 may include, but is not limited to, network node (for example, a base station such as eNB, gNB, etc.) 101 and electronic device (for example, a UE) 105. Electronic device 105 (hereinafter referred to as UE 105) can include an electronic device configured to operate based on a wide variety of wireless communication techniques. These techniques can include, but are not limited to, techniques based on 3rd Generation Partnership Project (3GPP) standards. For example, UE 105 can include an electronic device configured to operate using Release 15 (Rel-15). Release 16 (Rel-16) or later 3GPP standards. UE 105 can include an electronic device configured to operate using Rel-15 NR, Rel-16 NR and/or Rel-16 NR-U (New Radio Unlicensed). UE 105 can include, but is not limited to, wireless communication devices, smart phones, laptops, desktops, tablets, personal assistants, monitors, televisions, wearable devices, Internet of Things (IoTs), vehicle's communication devices, and the like. Network node 101 (herein referred to as base station) can include nodes configured to operate based on a wide variety of wireless communication techniques such as, but not limited to, techniques based on 3GPP standards. For example, base station 103 can include nodes configured to operate using Rel-15. Rel-16, Rel-16 NR, Rel-16 NR-U. or later. UE 105 can be connected to and can be communicating with base station 101 using one or more communication links 107.

According to some aspects, base station 101 can transmit one or more Synchronization Signal Blocks (SSBs) to UE 105. The SSB can be referred to as Synchronization Signal (SS)/Physical Broadcast Channel (SS/PBCH) block. The SSB can include synchronization signal such as Primary Synchronization Signal (PSS) and Secondary Synchronization Signal (SSS). Additionally, the SSB can include PBCH. According to some aspects, in Rel-15 NR, base station 101 can inform UE 105 which SSBs are transmitted and which SSBs are not transmitted. Additionally, or alternatively, base station 101 can inform UE 105 of a transmission pattern of the SSBs. For example, base station 101 can inform UE 105 of the actual SS/PBCH block transmission within a SSB burst using a System Information Block (SIB) in case of standalone (SA) scenarios or a dedicated Radio Resource Control (RRC) message for non-standalone cases using bitmap ssb-PositionsInBurst information element (IE). Therefore, using the transmission pattern, UE 105 can assume that the Physical Resource Block(s) (PRBs) that contain actual SSB transmissions are not available for Physical Downlink Shared Channel (PDSCH) in Orthogonal Frequency Division Multiplexing (OFDM) symbols where SSB is transmitted.

According to some aspects, Rel-16 NR technology can operate in unlicensed bands (NR-U). When operating in an unlicensed band, and in order to coexist with other technologies in that band, base station 101 and/or UE 105 can implement a listen-before-talk (LBT) procedure to examine the channel before transmitting on the channel. Base station 101 can use Discovery Reference Signal (DRS) windows to transmit SSBs to UE 105. However, the actually transmitted SSBs may be time-shifted in the DRS windows subject to the LBT result. Therefore, simply using Rel-15 ssb-PositionsInBurst IE with one-to-one mapping with SSB(s) may not be sufficient for PDSCH rate-matching as UE 105 cannot be fully aware of the actual transmission of the SSB(s) in the DRS windows due to the time shifting operation of SSBs.

Figure 2:
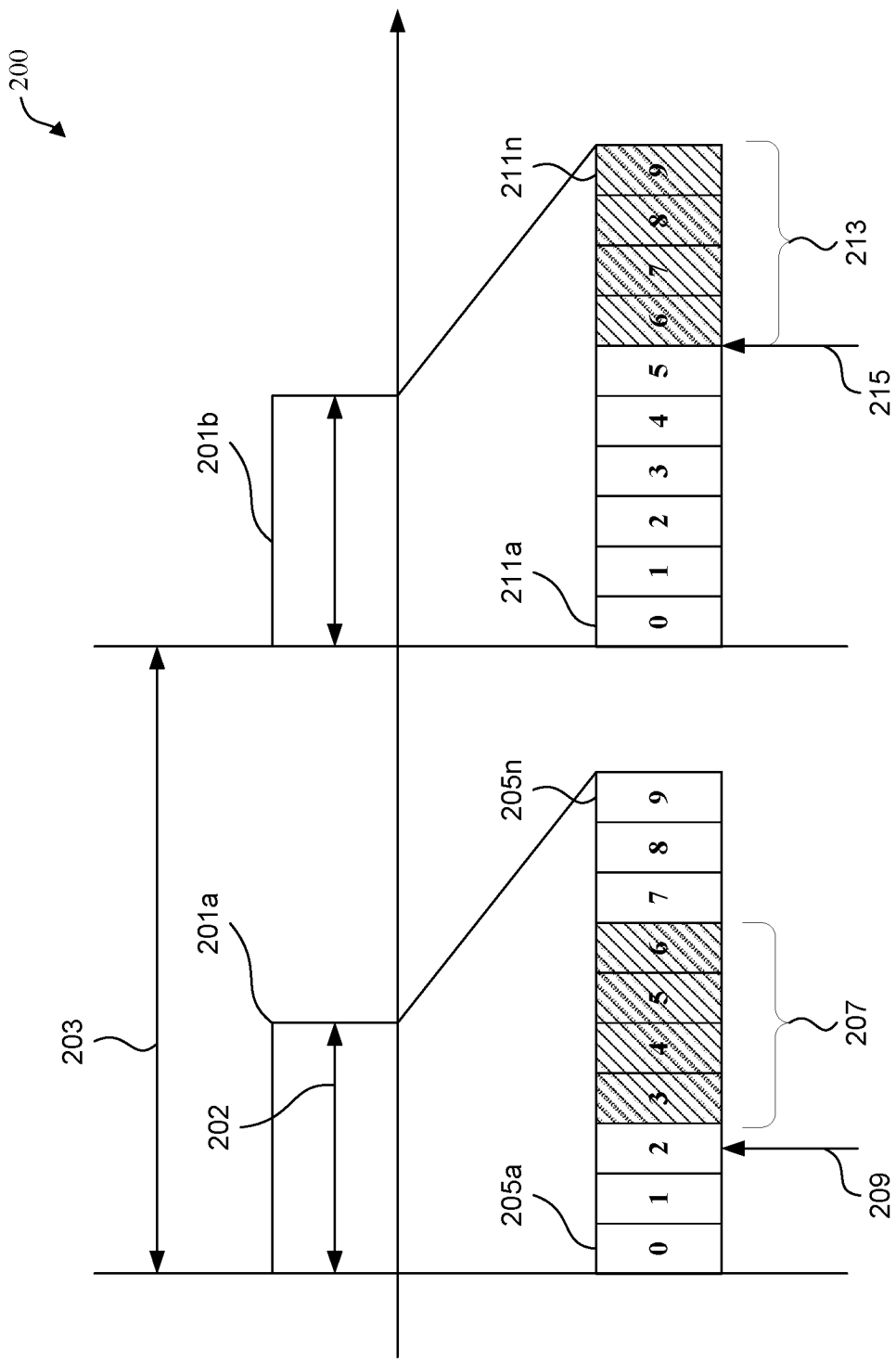
FIG. 2 illustrates one exemplary transmission of Synchronization Signal Blocks (SSBs), according to some aspects of the disclosure.

For example. FIG. 2 illustrates one exemplary transmission 200 of SSB(s), according to some aspects of the disclosure. As illustrated in FIG. 2. SSBs can be transmitted during DRS windows 201a and 201b. In a non-limiting example, each DRS window 201a-b can have a size 202 of 5 ms. However, these DRS windows can have other sizes. Also, DRS windows 201a-b can repeat based on a DRS periodicity 203. As illustrated, in FIG. 2. DRS window 201a can include candidate SSB positions 205a-n. Base station 101 is able to transmit SSBs after base station 101 determines that the channel is free for transmission. Therefore, base station 101 can transmit SSBs on candidate SSB positions 207 after a successful LBT 209. In this example, the parameter Q is 4, and 4 physical beams are deployed. However, the aspects of this disclosure are not limited to this example.

Similarly, DRS window 201b can include candidate SSB positions 211a-n. Base station 101 is able to transmit SSBs after base station 101 determines that the channel is free for transmission. Therefore, base station 101 can transmit SSBs on candidate SSB positions 213 after a successful LBT 215. In this example, LBT success 215 occurs at a different candidate SSB position than LBT success 209. Therefore, the actual transmission of SSBs are time shifted across consecutive DRSs.

Figure 3:
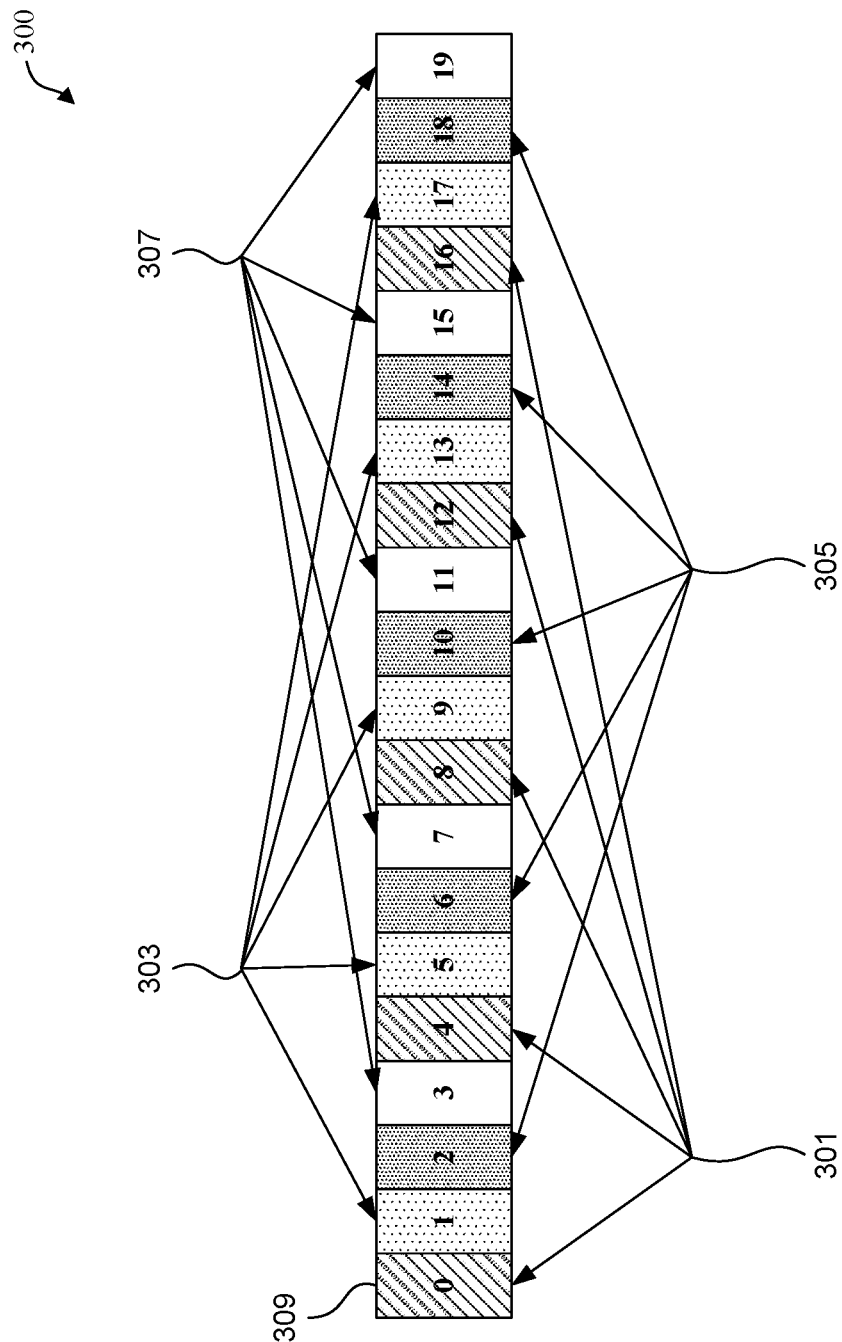
FIG. 3 illustrates one exemplary Synchronization Signal Block (SSB) grouping, according to some aspects of this disclosure.

According to some aspects, methods and systems are provided to indicate the actual SSBs transmission for PDSCH rate-matching purposes. For example, methods and systems are provided for PDSCH resource mapping for operation with shared spectrum channel access. FIG. 3 illustrates one exemplary SSB grouping, according to some aspects of this disclosure.

According to some aspects, the number of candidate SSB positions can be extended from 10 positions to 20 positions. By increasing the number of candidate SSB positions, the probability of LBT success increases. Additionally, or alternatively, the candidate SSB positions within a DRS window can be divided into different SSB groups at least based on the value of a parameter Q. In some examples, parameter Q can be indicated and/or transmitted by base station 101 to UE 105 using Master Information Block (MIB), payload of PBCH, and/or System Information Block 1 (SIB1). Using the parameter Q, UE 105 can perform the grouping of the SSBs. Additionally, or alternatively, base station 101 can use other signaling to transmit the value of the parameter Q. In some examples, base station 101 can use other parameters to signal to UE 105 the SSB groups and/or SSB grouping scheme.

In some examples, the candidate SSB positions in time window and/or a half frame can be indexed in an ascending order in time from, for example, 0 to L−1. The candidate SSB positions with g=module (i,Q) value can be in a same group index g. FIG. 3 illustrates candidate SSB positions in a time window (e.g., DRS window 300) that are grouped into four groups. However, the aspects of this disclosure are not limited to this example, and other number of grouping and other methods of grouping can be used. In this non-limiting example, for Q=4 and L=20, the candidate SSB positions in the time window and/or half frame are grouped as following:

SSB Group 0 301: {0, 4, 8, 12, 16}
SSB Group 1 303: {1, 5, 9, 13, 17}
SSB Group 2 305: {2, 6, 10, 14, 18}
SSB Group 3 307: {3, 7, 11, 15, 19}

According to some aspects, when UE 105 receives data on the Physical Downlink Share Channel (PDSCH), UE 105 assumes the SSB group transmissions according to the ssb-PositionsInBurst IE as indicated in SIB1 and/or a dedicated signaling. In other words, in Rel-15 NR each bit in the ssb-PositionsInBurst IE corresponds to one candidate SSB position. In the exemplary aspect of FIG. 3, each bit in the ssb-PositionsInBurst IE can correspond to one SSB group. According to some aspects, if the PDSCH resource allocation overlaps with PRBs containing SSB group transmission resources, UE 105 assumes that the PRBs containing SSB group transmission resources are not available for PDSCH in the OFDM symbols where SSB group is transmitted.

In some examples, to further improve the resource utilization, UE assumes that other later Quasi Co-located (QCLed) SSB will not be transmitted in the same DRS window and hence, UE 105 does not perform rate-matching for PDSCH transmission as long as one of the QCLed SSBs in the same DRS window 300 has been detected by UE 105. As a non-limiting example, UE 105 determines that candidate SSB position 0 (309) in SSB group 301 is used for SSB transmission and UE 105 receives the SSB position 0 (309). In this example, UE 105 can determine or assume that the corresponding QCLed candidate SSB positions (4, 8, 12, and 16) in the same SSB group 301 are not being used for SSB transmission. And therefore, UE 105 does not perform rate-matching operation for PDSCH transmission for the corresponding candidate SSB positions (4. 8, 12, and 16) in this DRS window 300.

In addition to the downlink transmission method discussed above, the aspects of this disclosure also provide methods and systems for interlace uplink transmissions. For example, UE 105 can communicate with base station 101 using Physical Uplink Control Channel (PUCCH). According to some aspects, PUCCH can include and carry Uplink Control Information (UCI). In some examples, there are five different formats of PUCCH-Format 0, Format 1, Format 2, Format 3, and Format 4. In some examples, depending on how many bits of information is to be carried and how many symbols are assigned, UE 105 can determine which format to use.

According to some aspects, in Rel-15, a PUCCH Format 2 or 3 resource can have a configurable number of Physical Resource Blocks (PRBs) between, for example, 1 and, for example, 16. In some examples, the upper end of this range of PRBs can be used for a case where a PUCCH resource carries large payloads. In some examples, the large payload can include Channel State Information (CSI) feedback for multiple serving cells. In some examples, the PUCCH Format 2 or 3 can support two interlaces to provide comparable UCI payload capacity as in Rel-15. In some examples, interlacing can include techniques used to assign and/or allocate physical resources according to a pattern. In interlace resource allocation (RA), the basic unit of RA is an interlace. In a non-limiting example, an interlace can include 10 equally spaced resource blocks (RBs) within a 20 MHz frequency bandwidth for 15 kHz Sub-Carrier Spacing (SCS). In another non-limiting example, an interlace can include 5 equally spaced resource blocks (RBs) within a 20 MHz frequency bandwidth for 30 KHz SCS. In some examples, the interlace resource allocation can include two interlaces having a first interlace index and a second interlace index. Some aspects of this disclosure are directed to methods and systems for resource allocation for interlaced PUCCH Format 2 or 3. For example, methods and systems are provided to signal the second interlace index and/or to resolve the gap between 16 PRBs in Rel-15 and, for example, 10 PRB in the interlace design.

Figure 4A:
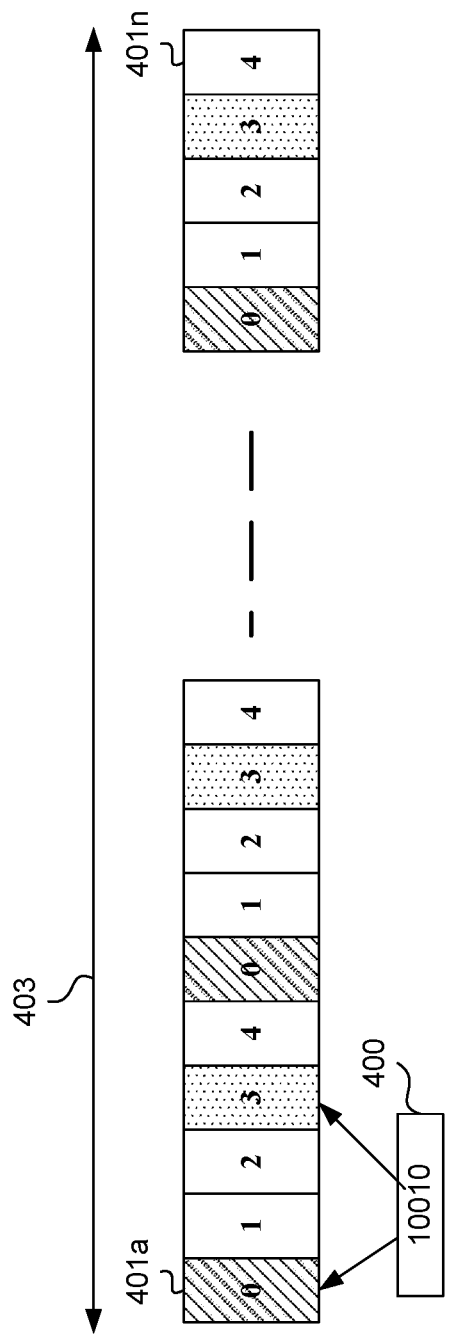
FIGS. 4A and 4B illustrate exemplary methods for interlace signaling for Physical Uplink Control Channel (PUCCH) format, according to some aspects of this disclosure.
Figure 4B:

FIGS. 4A and 4B illustrate exemplary methods for interlace signaling for PUCCH format, according to some aspects of this disclosure. For example, FIG. 4A illustrates one exemplary bitmap 400 for interlace signaling for PUCCH format, according to some aspects of this disclosure. In some aspects, base station 101 transmits bitmap 400 to UE 105. For example, base station 101 can use Downlink Control Information (DCI) to transmit the bitmap 400 to UE 105. Base station 101 can transmit the DCI over PDCCH to UE 105. Additionally, or alternatively, base station 101 can use other signals and/or signaling methods to communicate bitmap 400 to UE 105. For example, base station 101 can use Radio Resource Control (RRC) message(s) to communicate/configure bitmap 400 to UE 105 and later use the DCI to inform UE 105 to use bitmap 400 for PUCCH transmission.

Bitmap 400 can include a one-to-one mapping with a set of interlaces of the serving cells. For example, bitmap 400 can include bits mapping to corresponding interlace indices 401a-401n within Bandwidth Part (BWP) 403. In a non-limiting example, a value of '0' in bitmap 400 can indicate that the corresponding interlace is not allocated for this PUCCH resource. In this non-limiting examples, a value of '1' in bitmap 400 can indicate that the corresponding interlace is allocated for the PUCCH resource. In the non-limiting example of FIG. 4A, bitmap 400 of 10010 indicates that interlaces with index 0 and index 3 are allocated for the PUCCH resource. And, interlaces with index 1, index 2, and index 4 are not allocated for the PUCCH resource.

According to some aspects, the size of bitmap 400 can depend on the SCS of the PUCCH. In a non-limiting example, for a SCS of 30 kHz, the size of bitmap 400 can be 5 bits. In another non-limiting example, for a SCS of 15 kHz, the size of bitmap 400 can be 10 bits.

According to some aspects, to minimize the signaling overhead of the DCI (or other signaling(s)) used to communicate the resource allocation for interlaces PUCCH), the second interlace index $k_2$ can be implicitly derived based on the first interlace index k; according to one of the following equations:

$$k_2 = k_1 + \left\lfloor \frac{N^u_{interlaces}}{2} \right\rfloor \quad (1)$$

$$k_2 = \text{module}(k_1 + 1, N^u_{interlaces}) \quad (2)$$

Here, $N_{interlaces}^u$ is the number of interlace indices for SCS u.

For example, as illustrated in FIG. 4B, the first interlace index $k_1$ 411 is 0 and the second interlace index $k_2$ 413 is determined as $k_2=k_1+[5/2]=2$. In this example, base station 101 can communicate the first interlace index $k_1$ to UE 105. Base station 101 can use DCI (or other signaling(s)) to communicate the first interlace index $k_1$. UE 105 can use the first interlace index $k$; to determine the second interlace index $k_2$ using the first equation (equation (1)) above.

As another example, as illustrated in FIG. 4B, the first interlace index $k_1$ 421 is 0) and the second interlace index $k_2$ 423 is determined as $k_2$=module (0+1, 5)=1. In this example, base station 101 can communicate the first interlace index $k_1$ to UE 105. Base station 101 can use DCI (or other signaling(s)) to communicate the first interlace index $k_1$. UE 105 can use the first interlace index $k_1$ to determine the second interlace index $k_2$ using the first equation (equation (2)) above.

In some examples, base station 101 can use DCI or other signaling(s) to communicate to UE 105 which equation to use. Additionally, or alternatively, the choice of the equation can be communicated to UE 105 when UE 105 first connects to base station 101. In some examples, UE 105 can independently determine which equation to use based on, for example, UE 105's measurement of channel(s) and UE 105 can communicate to base station 101 which equation was used.

Additionally, according to some aspects of this disclosure, methods and systems are provided to associate Zadoff-Chu sequence and/or Orthogonal Cover Code (OCC) length for interlace PUCCH Format 3 (for example, for enhanced interlace PUCCH Format 3). In some examples, PUCCH Format 3 can support user multiplexing by assigning different OCCs or cyclic shifts of Zadoff-Chu sequence to different users. According to some examples, the user multiplexing for reference symbols can be based on the use of different cyclic shifts of the same base sequence for all multiplexed users. The user multiplexing for the UCI can be based on the application of pre-DFT (Discrete Fourier Transform) OCC for UCI symbols. According to some aspects of this disclosure, methods and systems are provided to map between OCC index applied on the UCI symbols and the cyclic shift applied to DeModulation Reference Signal (DMRS) symbols that are used for a given PUCCH resource. In some examples, Time Division Multiplexing (TDM) is used for multiplexing UCI symbols and DMRS symbols for PUCCH Format 3.

According to some aspects, the mapping between Cyclic Shift (CS) and OCC for PUCCH Format 3 is provided in Table 1.

TABLE 1

Mapping between OCC and CS index

| OCC Index | CS Index | |
|---|---|---|
| | OCC = 2 | OCC = 4 |
| 0 | 0 | 0 |
| 1 | 6 | 3 |
| 2 | | 6 |
| 3 | | 9 |

In one example, the mapping as illustrated in Table 1 can be communicated from base station 101 to UE 105 using DCI or other signaling(s). Additionally, or alternatively, an OCC Index from Table 1 can be communicated from base station 101 to UE 105 using DCI or other signaling(s).

According to some aspects, UE 105 can use the OCC Index for generating the UCI symbol(s) and can use the CS Index for generating the DRMS symbol(s). In a non-limiting example, when UE 105 receives or determines OCC Index 0 for a PUCCH resource, UE 105 can use the number of OCCs to determine the CS Index for the same PUCCH resource. For example, if the number of OCCs or the length of OCC sequence is 2, UE 105 uses CS Index 0 for generating the DRMS symbol(s). If the number of OCCs or the length of OCC sequence is 4, UE 105 also uses CS Index 0 to generate DRMS symbol(s). As another non-limiting example, if OCC Index is 1, if the number of OCCs or the length of OCC sequence is 2. UE 105 uses CS Index 6 for generating the DRMS symbol(s). If the number of OCCs or the length of OCC sequence is 4, UE 105 also uses CS Index 3 to generate DRMS symbol(s). As another non-limiting example, if OCC Index is 2, the number of OCCs cannot be 2. If the number of OCCs or the length of OCC sequence is 4, UE 105 also uses CS Index 6 to generate DRMS symbol(s). As another non-limiting example, if OCC Index is 4, the number of OCCs or the length of OCC sequence cannot be 2. If the number of OCCs or the length of OCC sequence is 4. UE 105 also uses CS Index 9 to generate DRMS symbol(s).

According to some aspects, to reduce the Peak-to-Average Power Ratio (PAPR) and/or Cubic Metric (CM) values for interlace PUCCH Format 2, the OCC index for a Physical Resource Block (PRB) can be cycled across PRBs within an interlace. For example, the OCC index $S_i$ for $PRB_i$ can be cycled based on the following equation:

$$S_i = (S_0+i) \bmod N_{SF}^{PUCCH2} \qquad (3)$$

Here, $N_{SF}^{PUCCH2}$ is the number of OCCs.

In some examples, UE 105 can use the OCC Index for generating the UCI symbol(s). In some examples, Frequency Division Multiplexing (FDM) is used for multiplexing UCI symbols and DMRS symbols for PUCCH Format 2. By using different OCCs for different PRBs within an interlace, the Peak-to-Average Power Ratio (PAPR) and/or Cubic Metric (CM) values for interlace PUCCH Format 2 can be reduced.

In some examples, the OCC indices and their cycling across PRBs within an interlace can be communicated from base station 101 to UE 105. For example, base station 101 can use DCI (or other signaling(s)) to signal OCC indices and their cycling across PRBs.

In some examples, instead of (or in addition to) using different OCC indices for different PRBs within an interlace PUCCH Format 2, a scrambling sequence can be used in UE 105. For example, to reduce the PARP and/or CM values for interlace PUCCH Format 2, UE 105 may apply the scrambling sequence per transmission to the symbols associated with PUCCH Format 2. For example, the same OCC index can be applied to the PRBs within one interlace to generate a first sequence. Then, the scrambling sequence can be applied to the first sequence to generate a second sequence. The second sequence can be used for generating UCI symbols.

In some examples, base station 101 can generate the scrambling sequence and communicate the scrambling sequence to UE 105. For example, base station 101 can use DCI (or other signaling(s)) to communicate the scrambling sequence to UE 105. Additionally. or alternatively, base station 101 can use DCI (or other signaling(s)) to communicate to UE 105 parameter(s) used for generating the scrambling sequence. In some examples, the scrambling sequence generator (at UE 105 and/or base station 101) may be initialized with C-RNTI (Cell Radio Network Temporary Identifier), slot index, and/or cell ID (Identifier). In some examples, using slot index and/or cell ID can reduce interference(s) within and/or between cells.

According to some other aspects of this disclosure, methods and systems are provided for resource allocation for partial interlace Physical Upload Shared Channel (PUSCH). In some examples, for PUSCH transmission in NR-U systems, the minimum resource allocation granularity can be one interlace (e.g., 10 PRBs). This granularity can be too coarse for small PUSCH payloads. Some aspects of this disclosure provide methods and systems to support partial interlace allocation for PUSCH (e.g., in NR-U systems) and support signaling the partial interlace allocation.

According to some aspects, Downlink Control Information (DCI) transmitted from base station 101 can signal to UE 105 the resource allocation for partial interlace PUSCH. In one example, one field in the DCI can be used to indicate the starting LBT bandwidth ($SB_{start}$) and a length in terms of contagiously allocated LBT bandwidths (e.g., number of contagiously allocated LBT bandwidths—$L_{SBs}$). According to some aspects, the DCI can include a Resource Indication Value (RIV) to indicate the starting LBT bandwidth and the number of contagiously allocated LBT bandwidths. In one example, the RIV of the DCI can be defined as following:

If $(L_{SBs}-1) \leq \lfloor N_{BWP}^{SB,size}/2 \rfloor$ then $RIV = N_{BWP}^{SB,size}$
$((L_{SBs}-1)+SB_{start})$ (4)

Else $RIV = N_{BWP}^{SB,size}(N_{BWP}^{SB,size}, L_{SBs}-1)+$
$(N_{BWP}^{SB,size}-1-SB_{start})$. (5)

Here, $N_{BWP}^{SB,size}$ is the number of LBT sub-bands within a Bandwidth Part (BWP).

After receiving the DCI, UE 105 can use the RIV and/or the starting LBT bandwidth and the number of contagiously allocated LBT bandwidths to determine the resource allocation for its partial interlace PUSCH. UE 105 can transmit data to base station 101 using the resource allocated in the partial interlace PUSCH.

According to some aspects, UE 105 can be configured by higher layers a set of PUSCH resource allocation patterns. Additionally, or alternatively, UE 105 can receive the set of PUSCH resource allocation patterns from base station 101. For example, UE 105 can receive the set of PUSCH resource allocation patterns from base station 101 using DCI transmitted by base station 101. In another examples, UE 105 can receive the set of PUSCH resource allocation patterns from base station 101 using RRC message(s).

In some examples, each pattern can indicate PUSCH interlace allocation across consecutive LBT bandwidths using a bitmap approach. For example, a bitmap can be used to indicate one or more LBT sub-bands that are allocated for PUSCH transmission. In another example, the bitmap can indicate one or more sub-bands that are not used/available for PUSCH transmission (e.g., indicate rate-matching around the indicated LBT sub-bands for PUSCH transmission.)

FIG. 5 illustrates one exemplary partial interlace PUSCH resource allocation 500, according to some aspects of the disclosure. In this exemplary aspect. BWP 501 can include four LBT sub-band 503a-503d. Each LBT sub-band 503 can be separated from the consecutive LBT sub-band 503 by a guard band 505 (505a-505c). It is noted the aspects of this disclosure are not limited to this example and other number of LBT sub-bands and guard bands can be used. In this example, LBT sub-band 503a is not used for PUSCH transmission, but LBT sub-bands 53b-d are allocated for PUSCH transmission. This resource allocation for partial interlace PUSCH can be set using Pattern Index 0 from Table 2 below.

In one example, Pattern Index 0) can correspond to bitmap 0111 (Alternative 1). In this example, bit value '0' in the bitmap indicates that the corresponding LBT sub-band (e.g., LBT sub-band 503a) is not used/available for PUSCH transmission. Bit value '1' in the bitmap indicates that the corresponding LBT sub-bands (e.g., LBT sub-bands 503b-d) are allocated for PUSCH transmission. In another example, Pattern Index 0 can correspond to bitmap 1000 (Alternative 2). In this example, bit value '1' in the bitmap indicates that the corresponding LBT sub-band (e.g., LBT sub-band 503a) is not used/available for PUSCH transmission. Bit value '0' in the bitmap indicates that the corresponding LBT sub-bands (e.g., LBT sub-bands 503b-d) are allocated for PUSCH transmission.

As discussed above, base station 101 may transmit the Pattern Index and/or Alternative 1 or 2 bitmaps to UE 105 using DCI (or other signaling(s)). Base station 101 can use measurements such as, but not limited to, the downlink channel's measurements to determine which one of the Alternative 1 or 2 bitmaps to send to UE 105. For example, if base station 101 determines (e.g., using Channel State Information (CSI) report from UEs such as UE 105) that the downlink channel is congested, base station 101 can send Alternative 2 bitmap (e.g., 1000) to UE 105.

TABLE 2

Partial Interlace PUSCH Resource Allocation

| Pattern Index | Alternative 1 | Alternative 2 |
|---|---|---|
| 0 | 0111 | 1000 |
| 1 | 1100 | 0011 |
| 2 | 0110 | 1001 |
| ... | ... | ... |

In some examples in Rel-15, configuration for cell specific PUCCH is broadcasted. For example, base station 101 can transmit configuration for cell specific PUCCH. Base station 101 can use MIB, SIB1, and/or DCI to transmit the configuration for cell specific PUCCH. For example, the configuration can be provided by the parameter pucch-ResourceCommon in the PUCCH-ConfigCommon IE, which is signaled via SIB1 for PUCCH transmission(s) in an initial uplink (UL) BWP of an Special Cell (SpCell). SpCell can include a Primary Cell (PCell) or a Primary Secondary Cell (PSCell), according to some examples. The parameter can take an integer value in the range of 0-15, which can select one PUCCH resource set predefined in, for example, 3GPP specification, according to some aspects. Additionally, UE 105 can determine a PUCCH resource configuration (such as, but not limited to, PRB location, initial cyclic shift index, etc.) depending on the PUCCH resource indicator in DCI using a predefined equation.

Some aspects of this disclosure are directed to methods and systems for signaling the interlaced cell-specific PUCCH resource allocation prior to a dedicated RRC connection. For examples, some methods and systems of this disclosure can increase the UE multiplexing capacity to minimize the cell-specific PUCCH overhead.

According to some aspects, before connecting to base station 101, UE 105 can search for a cell to attach. After completing the search, UE 105 can perform a Radio Resource Control (RRC) connection setup process. In one example, UE 105 can send an attach request to base station 101 and/or a mobility management entity (MME) (not shown) associated with base station 101. In some examples, the attach request can include an identifier of UE 105. In some aspects, if MME accepts the attach request, MME can send a setup request to, for example, base station 101. In some examples, after receiving the setup request, and if base station 101 does not know the capabilities of UE 105, base station 101 can send a request to UE 105 to request the capabilities of UE 105. According to some aspects, UE 105 can send its capabilities to base station 101. In response, base station 101 can send an RRC connection reconfiguration message back to UE 105. Then UE 105 can start data communication using base station 101. Additionally, UE 105 can send CSI report(s) to the base station.

According to some aspects, after UE 105 searching and detecting base station 101 and/or the cell associated with base station 101, base station 101 can send MIB and SIB1 to UE 105. In some examples, SIB1 can include parameters that define the PUCCH (e.g., PUCCH Resource). One parameter defining the PUCCH can include "PRB offset" value. According to some aspects. SIB1 can be used for signaling the interlaced cell-specific PUCCH resource allocation. For example, the "PRB offset" value configured by SIB1 may be re-interpreted by UE 105 as starting interlace index. UE 105 can further determine the index of an interlace $I_{PUCCH}$ as follows:

$$I_{PUCCH} = S_{int} + \lceil r_{PUCCH}/N_{CS} \rceil \quad (6)$$

Here, $S_{int}$ is the starting interlace, $r_{PUCCH}$ is the number of cell-specific PUCCH resources, and Nos is the number of initial cyclic shift (CS) index sets.

In this example, base station 101, using the "PRB offset" value configured in SIB1 can allocate resources for the interlaced cell-specific PUCCH transmission at UE 105.

Figure 6:
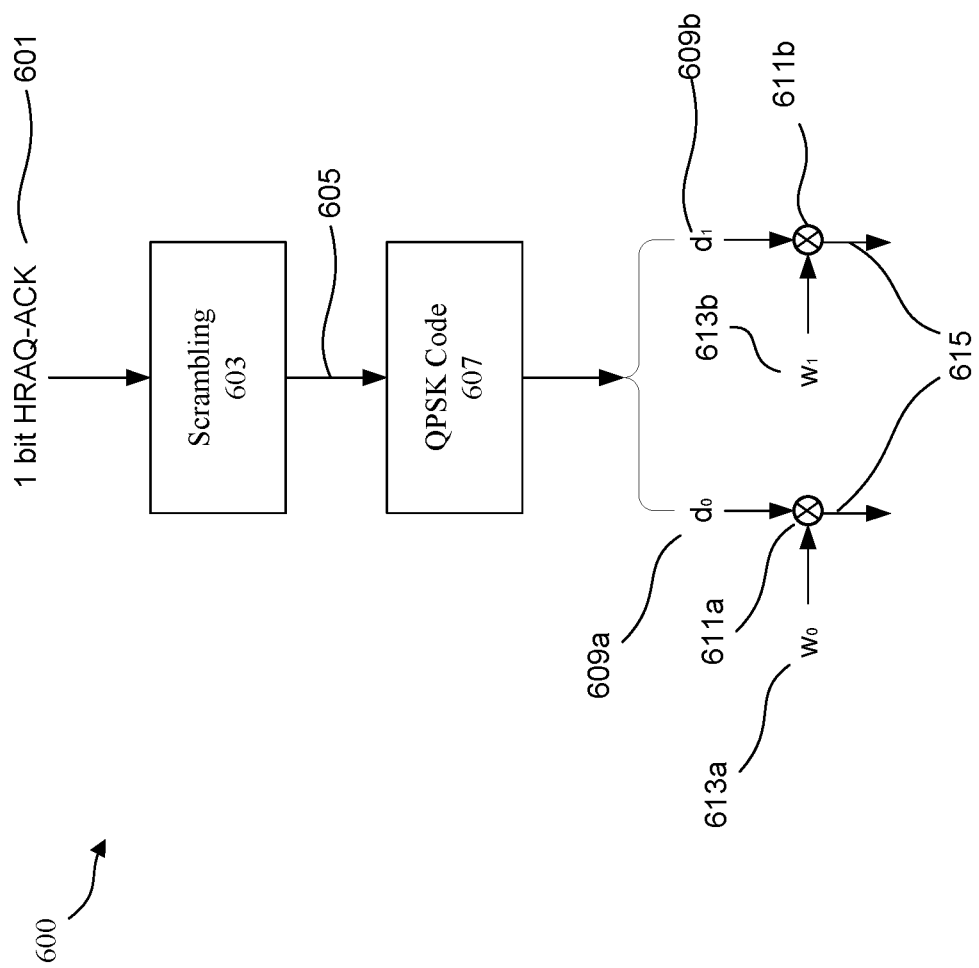
FIG. 6 illustrates one simplified exemplary system for enhanced PUCCH Format 0 or 1 with time-domain Orthogonal Cover Code (OCC), according to some aspects of the disclosure.

Additionally, or alternatively, to further increase UE 105's multiplexing capacity of interlaced PUCCH Format 0 or 1, the PUCCH resource with interlace PUCCH Format 0 or 1 may include a time-domain Orthogonal Cover Code (OCC) $\{\omega_0, \omega_1\}$ with length $N_{SF}^{PUCCH,0/1}$. In some examples, $N_{SF}^{PUCCH,0/1}=2$, which can increase the capacity of interlaced PUCCH Format 0 or 1 two times. FIG. 6 illustrates one simplified exemplary system 600 for enhanced PUCCH Format 0 or 1 with time-domain OCC, according to some aspects of this disclosure.

According to some aspects, generating the PUCCH Format 0 or 1 can include one or more of generating PUCCH baseband sequence, group and sequence hopping, cyclic shift, scrambling, and/or modulation. The simplified exemplary system 600 illustrates a first sequence 601 that is generated from a PUCCH baseband sequence and cyclic shifted based on 1 bit Hybrid Automatic Repeat Request (Hybrid ARQ or HARQ) ACK (acknowledgment). In some examples, first sequence 601 is input to scrambling 603 to generate a second sequence 605. The scramble second sequence 605 can be modulated using, for example, Quadrature Phase Shift Keying (QPSK) code modulator 607. Output of modulator 607 includes two symbols 609a and 609b.

According to some aspects, system 600 further include time-domain OCC $\{\omega_0, \omega_1\}$ 613a and 613b that are modulated (e.g., multiplied) 611a and 611b to the two symbols 609a and 609b to generate the PUCCH Format 0 or 1 615.

According to some aspects, resource allocation (RA) is used to allocate resource blocks for a transmission. Resource allocation type specifies how the resource blocks are to be allocated. According to some examples, in Rel-15 NR, two resource allocation types can be defined. For example. Type-0 can be a RA with non-contiguous allocation using a bitmap where each bit represents a Resource Block Group (RBG). Type-1 can be a RA with contiguous allocation using Resource Indication Value (RIV), which indicates a start Resource Block (RB) and a bandwidth (in RBs) within a BWP.

Some aspects of this disclosure are directed to methods and systems to support dynamically switching between interlace RA and legacy RA. For example, methods and systems are provided to support dynamically switching between interlace RA and legacy Rel-15 RA using DCI.

In some examples, UE 105 and/or base station 101 can support and operate using both interlace RA (e.g., Rel-16 interlace RA) and legacy RA (e.g., Rel-15 RA). In these examples, base station 101 can be configured to send control information/instructions to UE 105 to dynamically switch between the interlace RA and legacy RA. In some aspects, the switching between interlace PUSCH RA and Type-1 RA can be supported using DCI. In other words, base station 101 can use DCI to instruct UE 105 to dynamically switch between the RAs. For example, the DCI can be based on inside of Channel Occupancy Time (COT) or outside of COT. According to some examples, higher signaling such as, but not limited to, an RRC message, can be used to signal to base station 101 and/or to UE 105 that UE 105 and/or base station 101 is capable of switching between interlace PUSCH RA and Type-1 RA. For example, using an RRC message, UE 105 can inform base station 101 that UE 105 supports both interlace RA and legacy RA. So, base station 101 can use DCI to instruct UE 105 to dynamically switch between these RAs.

According to some aspects, if both interlace PUSCH RA and Rel-15 Type-1 RA are configured, the Most Significant Bit (MSB) of the frequency domain RA (FDRA) is used to indicate to UE 105 which one of the Type-1 RA or interlace PUSCH RA to use. According to some aspects. FDRA can be a field in DCI. The number of bits for the FDRA field can be determined using the following:

$$\max(\lceil \log_2(N_{RB}^{DL,BWP}(N_{RB}^{DL,BWP}+1)/2) \rceil, X^u]) + 1 \text{ bits} \quad (7)$$

Here, $X^u$ is the bits number of Rel-16 interlace PUSCH. And $N_{RB}^{DL,BWP}$ is the number of RBs in a downlink BWP.

According to some aspects, the switching between interlace PUSCH RA and Type-0 and/or Type-1 RA as the PUSCH RA can also be supported by DCI. For example, base station 101 and UE 105 can communicate using, for example, RRC message(s) which two RA schemes among three are supported and/or activated by UE 105. As a non-limiting example, UE 105 can inform base station 101 (e.g., using RRC message(s)) that UE 105 supports and/or has activated Type-0 RA and interlace PUSCH RA. In another non-limiting example, UE 105 can inform base station 101 (e.g., using RRC message(s)) that UE 105 supports and/or has activated Type-1 RA and interlace PUSCH RA.

As discussed above, base station 101 can use DCI to dynamically select of the RAs for PUSCH RA. For example, base station 101 can use the MSB of FDRA field of DCI to dynamically select one of the activated RA schemes for PUSCH RA.

In addition to, or in alternative to, selecting the interlace RA for PUSCH RA, base station 101 can also select different interlace RA schemes to be used by UE 105. In some examples, the interlace RA schemes can include contiguous interlace RA and non-contiguous interlace RA. As a non-limiting example, FIG. 4B illustrates a non-contiguous interlace RA where interlace indices 411 and 413 are non-contiguous and also illustrates a contiguous interlace RA where interlace indices 421 and 423 are contiguous. According to some examples, different RIV values can be associated with different interlace RA schemes. As a non-limiting example, a 6-bit RIV field is included in the DCI for 15 KHz. The RIV value from 0 to 54 is used to indicate contiguous interlaces RA. e.g., a starting interlace and a length (e.g., number of contiguous interlace indices). While, the other RIV value, e.g., 55-63 can be used to indicate non-contiguous interlaces RA (e.g., to one-to-one indicate a predefined or RRC-configured interlaces combinations). With this approach, a single DCI can dynamically switch between contiguous and non-contiguous interlace RA for PUSCH transmissions.

Figure 7:
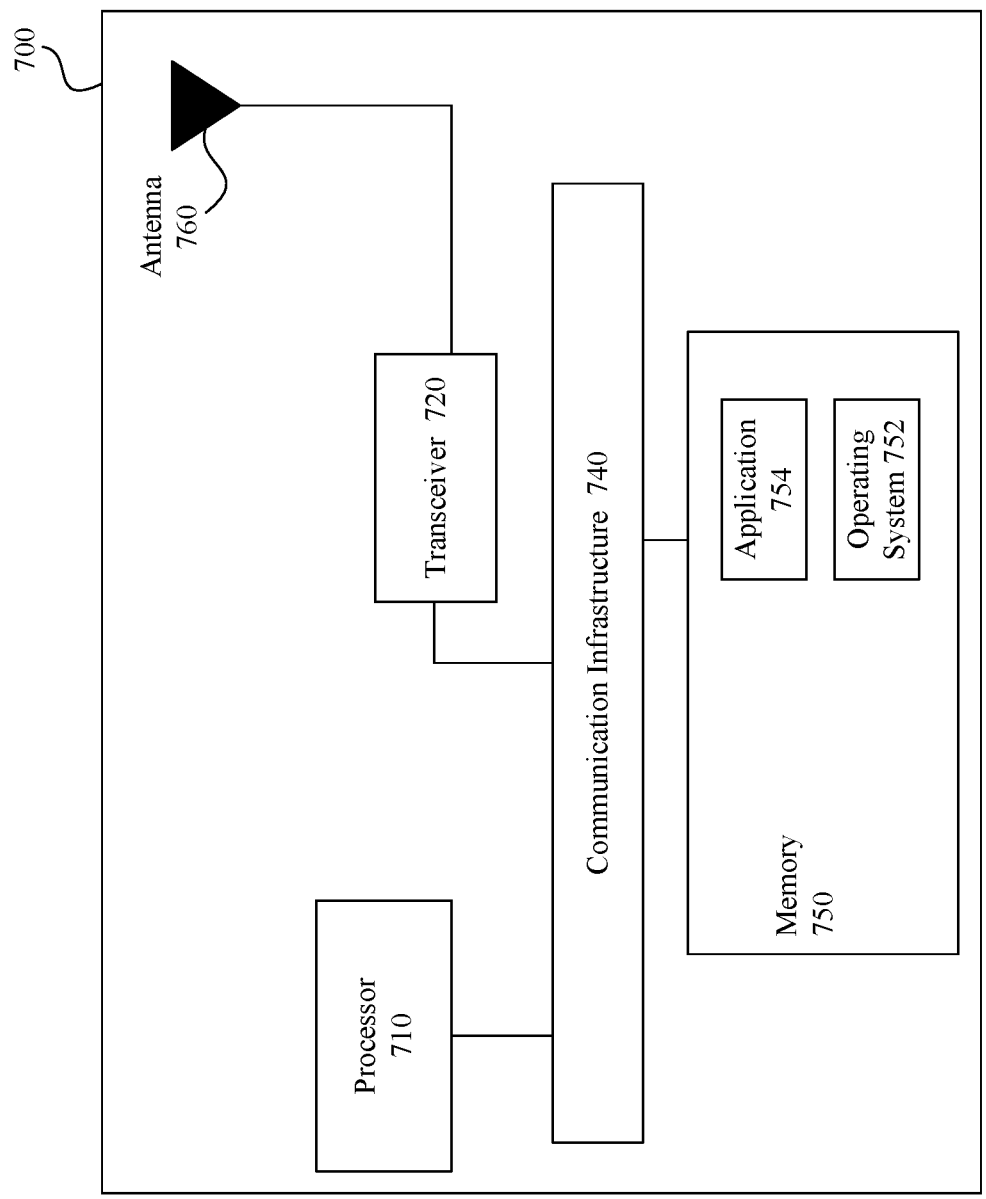
FIG. 7 illustrates a block diagram of an example system 700 of an electronic device implementing mechanisms for downlink transmission and interlace uplink transmission, according to some aspects of the disclosure.

FIG. 7 illustrates a block diagram of an example system 700 of an electronic device implementing mechanisms for downlink transmission and interlace uplink transmission, according to some aspects of the disclosure. System 700 may be any of the electronic devices (e.g., base station 101, UE 105) of system 100. System 700 includes processor 710, one or more transceivers 720, communication infrastructure 740, memory 750, operating system 752, application 754, and one or more antenna 760. Illustrated systems are provided as exemplary parts of system 700, and system 700 can include other circuit(s) and subsystem(s). Also, although the systems of system 700 are illustrated as separate components, the aspects of this disclosure can include any combination of these, less, or more components.

Memory 750 may include random access memory (RAM) and/or cache, and may include control logic (e.g., computer software) and/or data. Memory 750 may include other storage devices or memory such as, but not limited to, a hard disk drive and/or a removable storage device/unit. According to some examples, operating system 752 can be stored in memory 750. Operating system 752 can manage transfer of data from memory 750 and/or one or more applications 754 to processor 710 and/or one or more transceivers 720. In some examples, operating system 752 maintains one or more network protocol stacks (e.g., Internet protocol stack, cellular protocol stack, and the like) that can include a number of logical layers. At corresponding layers of the protocol stack, operating system 752 includes control mechanism and data structures to perform the functions associated with that layer.

According to some examples, application 754 can be stored in memory 750. Application 754 can include applications (e.g., user applications) used by wireless system 700 and/or a user of wireless system 700. The applications in application 754 can include applications such as, but not limited to, Siri™, FaceTime™, radio streaming, video streaming, remote control, and/or other user applications.

System 700 can also include communication infrastructure 740. Communication infrastructure 740 provides communication between, for example, processor 710, one or more transceivers 720, and memory 750. In some implementations, communication infrastructure 740 may be a bus. Processor 710 together with instructions stored in memory 750 performs operations enabling system 700 of system 100 to implement mechanisms for downlink transmission and interlace uplink transmission, as described herein.

According to some aspects, one or more transmitters 720 may be coupled to antenna 760. Antenna 760 may include one or more antennas that may be the same or different types. One or more transceivers 720 allow system 700 to communicate with other devices that may be wired and/or wireless. In some examples, one or more transceivers 720 can include processors, controllers, radios, sockets, plugs, buffers, and like circuits/devices used for connecting to and communication on networks. According to some examples, one or more transceivers 720 include one or more circuits to connect to and communicate on wired and/or wireless networks.

According to some aspects of this disclosure, one or more transceivers 720 can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 720 can include more or fewer systems for communicating with other devices.

In some examples, one or more transceivers 720 can include one or more circuits (including a WLAN transceiver) to enable connection(s) and communication over WLAN networks such as, but not limited to, networks based on standards described in IEEE 802.11.

Additionally, or alternatively, one or more transceivers 720 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 720 can include a Bluetooth™ transceiver.

Additionally, one or more transceivers 720 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220 can be configured to operate according to one or more of Rel-15, Rel-16, Rel-17, NR, NR-U or later of 3GPP standard.

According to some aspects of this disclosure, processor 710, alone or in combination with computer instructions stored within memory 750, and/or one or more transceiver 720, implements the methods and mechanisms discussed in this disclosure. For example, processor 710, alone or in combination with computer instructions stored within memory 750, and/or one or more transceiver 720, implements mechanisms for indicating the actual SSBs transmission for PDSCH rate-matching purposes. For example, processor 710, alone or in combination with computer instructions stored within memory 750, and/or one or more transceiver 720, implements mechanisms for PDSCH resource mapping for operation with shared spectrum channel access.

Additionally, or alternatively, processor 710, alone or in combination with computer instructions stored within memory 750, and/or one or more transceiver 720, implements mechanisms for resource allocation for interlaced PUCCH Format 2 or 3 and for signaling the second interlace index. Additionally, or alternatively, processor 710, alone or in combination with computer instructions stored within memory 750, and/or one or more transceiver 720, implements mechanisms for mapping between OCC index applied on the UCI symbols and the cyclic shift applied to DMRS symbols.

In some aspects, processor 710, alone or in combination with computer instructions stored within memory 750, and/or one or more transceiver 720, implements mechanisms for resource allocation for partial interlace Physical Upload Shared Channel (PUSCH). In some aspects, processor 710, alone or in combination with computer instructions stored within memory 750, and/or one or more transceiver 720, implements mechanisms for signaling the interlaces cell-specific PUCCH resource allocation prior to a dedicated RRC connection and/or increasing the UE multiplexing capacity to minimize the cell-specific PUCCH overhead.

Additionally, or alternatively, processor 710, alone or in combination with computer instructions stored within memory 750, and/or one or more transceiver 720, implements mechanisms for supporting dynamically switching between interlace and legacy Rel-15 RA using DCI format.

Figure 8A:
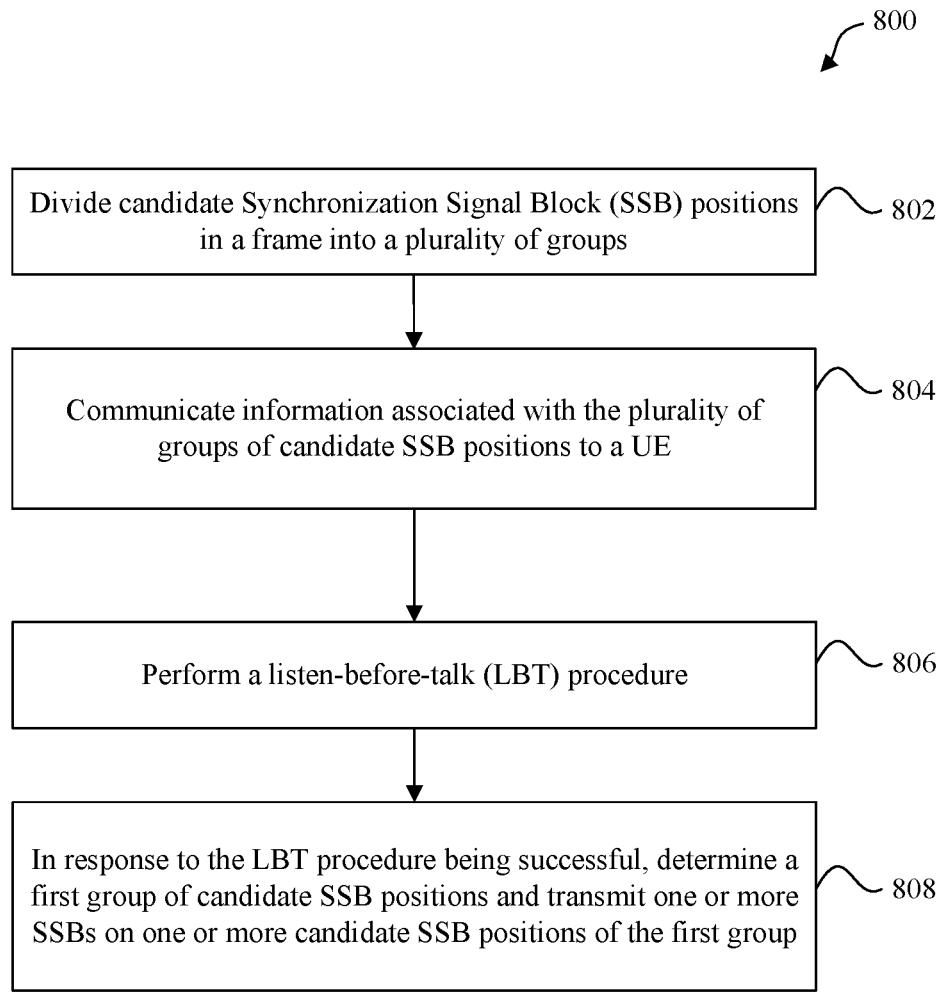
FIG. 8A illustrates an example method for a system (for example, a base station) supporting mechanisms for implementing Physical Downlink Shared Channel (PDSCH) resource mapping, according to some aspects of the disclosure.

FIG. 8A illustrates an example method 800 for a system (for example, base station) supporting mechanisms for implementing PDSCH resource mapping, according to some aspects of the disclosure. As a convenience and not a limitation, FIG. 8A may be described with regard to elements of FIGS. 1, 2, 3, 7, and 11. Method 800 may represent the operation of an electronic device (for example, base station 101 of FIG. 1) implementing mechanisms for implementing PDSCH resource mapping. Method 800 may also be performed by system 700 of FIG. 7 and/or computer system 1100 of FIG. 11. But method 800 is not limited to the specific aspects depicted in those figures and other systems may be used to perform the method as will be understood by those skilled in the art. It is to be appreciated that not all operations may be needed, and the operations may not be performed in the same order as shown in FIG. 8A.

At 802, candidate Synchronization Signal Block (SSB) positions in a time window are divided into a plurality of groups. For example, base station 101 is configured to group the candidate SSB positions into a plurality of groups. In the non-limiting example of FIG. 3, the candidate SSB positions are divided in four groups. In some examples, the time window can be a DRS window (e.g., DRS window 300). For example, step 802 is performed on a per DRS window.

At 804, information associated with the plurality of groups of candidate SSB positions are communicated to the UE (e.g., UE 105). In one example, the grouping of the candidate SSB positions is based on the parameter Q as discussed above. In some examples, base station 101 can transmit the parameter Q to UE 105 using MIB, payload of PBCH, or SIB1. Additionally, base station 101 can communicate the number of candidate SSB positions (e.g., parameter L discussed above) to UE 105.

At 806, an LBT procedure is performed. For example base station 101 performs the LBT procedure. If the LBT procedure is successful, base station 101 can determine a first group of candidate SSB positions and can transmit one or more SSBs on one or more candidate SSB positions of the first group at 808.

Figure 8B:
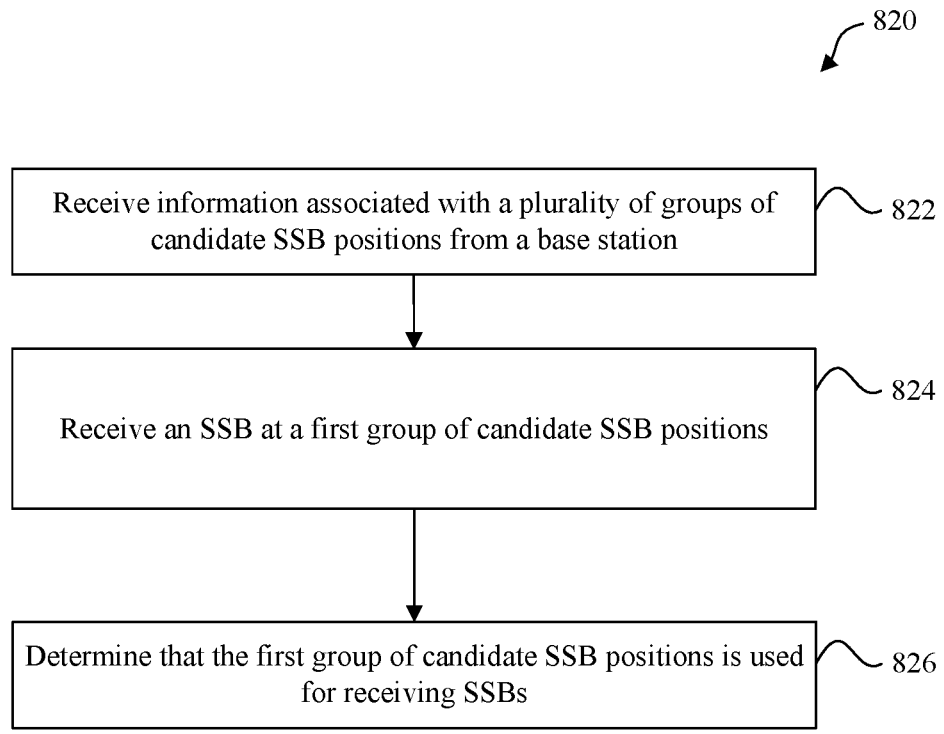
FIG. 8B illustrates an example method 820 for a system (for example, a user equipment (UE)) supporting mechanisms for implementing PDSCH resource mapping, according to some aspects of the disclosure.

FIG. 8B illustrates an example method 820 for a system (for example, a UE) supporting mechanisms for implementing PDSCH resource mapping, according to some aspects of the disclosure. As a convenience and not a limitation, FIG. 8B may be described with regard to elements of FIGS. 1, 2, 3, 7, and 11. Method 820 may represent the operation of an electronic device (for example, UE 105 of FIG. 1) implementing mechanisms for implementing PDSCH resource mapping. Method 820 may also be performed by system 700 of FIG. 7 and/or computer system 1100 of FIG. 11. But method 820 is not limited to the specific aspects depicted in those figures and other systems may be used to perform the method as will be understood by those skilled in the art. It is to be appreciated that not all operations may be needed, and the operations may not be performed in the same order as shown in FIG. 8B.

At 822, information associated with a plurality of groups of candidate SSB positions are received from a base station (e.g., base station 101). In one example, the grouping of the candidate SSB positions is based on the parameter Q as discussed above. In some examples, UE 105 can receive the parameter Q to from base station 101 using MIB. payload of PBCH, or SIB1. Additionally, UE 105 can receive the maximum number of candidate SSB positions (e.g., parameter L discussed above) from base station 101.

At 824, UE 105 can receive an SSB at a first group of candidate SSB positions. At 826, UE 105 can determine that the first group of candidate SSB positions is used for receiving SSBs. According to some aspects, if UE 105 receives PDSCH with PDSCH resource allocation overlapping with PRBs containing SSB group transmission resources, UE 105 assumes that the PRBs containing SSB group transmission resources are not available for PDSCH in the OFDM symbols where SSB group is transmitted.

Figure 9A:
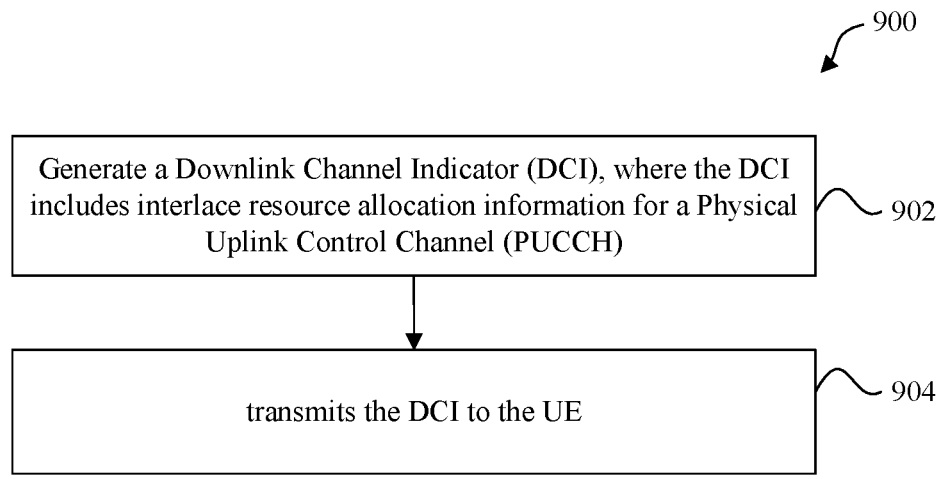
FIG. 9A illustrates an example method for a system (for example, base station) supporting mechanisms for implementing resource allocation for interlaces PUCCH, according to some aspects of the disclosure.

FIG. 9A illustrates an example method for a system (for example, base station) supporting mechanisms for implementing resource allocation for interlaces PUCCH, according to some aspects of the disclosure. As a convenience and not a limitation. FIG. 9A may be described with regard to elements of FIGS. 1, 4A, 4B, 6, 7, and 11. Method 900 may represent the operation of an electronic device (for example, base station 101 of FIG. 1) implementing mechanisms for implementing resource allocation for interlaces PUCCH. Method 900 may also be performed by system 700 of FIG. 7 and/or computer system 1100 of FIG. 11. But method 900 is not limited to the specific aspects depicted in those figures and other systems may be used to perform the method as will be understood by those skilled in the art. It is to be appreciated that not all operations may be needed, and the operations may not be performed in the same order as shown in FIG. 9A.

At 902, a Downlink Channel Indicator (DCI) is generated. For example, base station 101 generates the DCI. It is noted that although some aspects of this disclosure are discussed with respect to DCI, other signaling(s) can be used to transmit some of the information discussed herein from base station 101 to UE 105. In some examples, the DCI includes interlace resource allocation information for a Physical Uplink Control Channel (PUCCH).

At 904, base station 101 transmits the DCI to the UE.

In some aspects, the interlace resource allocation information for the PUCCH includes a bitmap, wherein a first value of a bit of the bitmap indicates that a corresponding interlace is allocated for the PUCCH. In some examples, the size of the bitmap can be based on a sub-carrier spacing of the PUCCH.

According to some aspects, the interlace resource allocation information includes a first interlace index and a second interlace index is calculated by UE 105 using the first interlace index, for example, as discussed above with respect to equations (1) or (2). In some examples, the second interlace index is based on the first interlace index and a number of interlaces for a sub-carrier spacing of the PUCCH. The PUCCH can include at least one of PUCCH Format 2 or PUCCH Format 3.

According to some aspects, the DCI communicated from base station 101 to UE 105 can also include a mapping between Orthogonal Cover Code (OCC) index applied on the UCI symbols and the cyclic shift applied to DMRS symbols. For example, the mapping between Cyclic Shift (CS) and OCC for PUCCH Forma 3 is provided in Table 1 discussed above. In one example, the mapping as illustrated in Table 1 can be communicated from base station 101 to UE 105 using the DCI (or other signaling(s)). Additionally. or alternatively, an OCC Index from Table 1 can be communicated from base station 101 to UE 105 using DCI (or other signaling(s)).

In some examples, the DCI can further include information for UE 105 to use a plurality of OCC indices and to cycle them across PRBs within an interlace. Additionally, or alternatively, the DCI can include information of UE 105 to apply a scrambling sequence per transmission to the symbols associated with PUCCH.

In some examples, base station 101 can be further configured to generate System Information Block 1 (SIB1), where the SIB1 can include a value configured to signal interlaced cell-specific PUCCH resource allocation to UE 105.

Figure 9B:
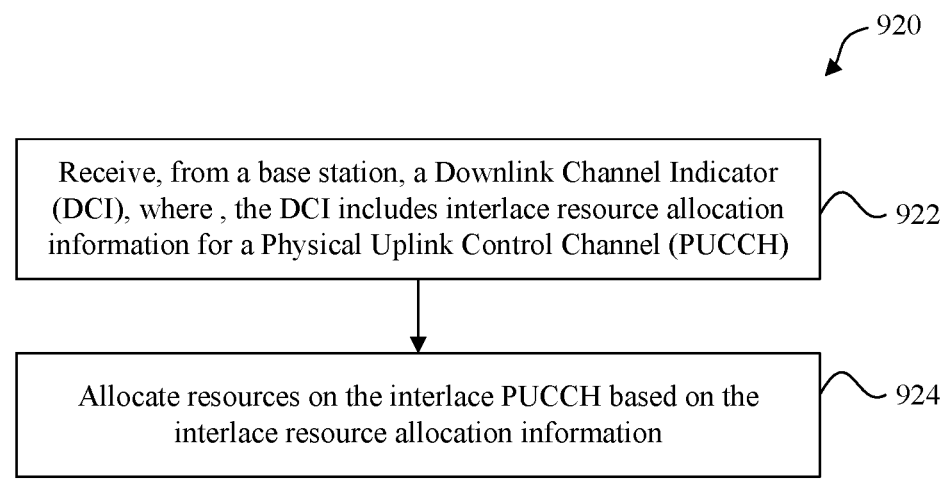
FIG. 9B illustrates an example method for a system (for example, a user equipment (UE)) supporting mechanisms for implementing resource allocation for interlaces PUCCH, according to some aspects of the disclosure.

FIG. 9B illustrates an example method for a system (for example, a user equipment (UE)) supporting mechanisms for implementing resource allocation for interlaces PUCCH, according to some aspects of the disclosure. As a convenience and not a limitation, FIG. 9B may be described with regard to elements of FIGS. 1, 4A, 4B, 6, 7, and 11. Method 920 may represent the operation of an electronic device (for example, UE 105 of FIG. 1) implementing mechanisms for implementing resource allocation for interlaces PUCCH. Method 920 may also be performed by system 700 of FIG. 7 and/or computer system 1100 of FIG. 11. But method 920 is not limited to the specific aspects depicted in those figures and other systems may be used to perform the method as will be understood by those skilled in the art. It is to be appreciated that not all operations may be needed, and the operations may not be performed in the same order as shown in FIG. 9B.

At 922, a Downlink Channel Indicator (DCI) is received. For example, UE 105 receives the DCI from base station 101. In some examples, the DCI includes interlace resource allocation information for a Physical Uplink Control Channel (PUCCH).

At 924, UE 105 can allocate resources on the PUCCH based on the interlace resource allocation information. After allocating the resource, UE 105 can use the allocated resource for PUCCH transmission to, for example, base station 101.

According to some examples, and as discussed with respect to, for example, FIG. 4A, the interlace resource allocation information for the PUCCH can include a bitmap, where a first value of a bit of the bitmap indicates that a corresponding interlace is allocated for the PUCCH.

According to some examples, and as discussed with respect to, for example, FIG. 4B, the interlace resource allocation information can include a first interlace index. During step 924, UE 105 can be further configured to calculate a second interlace index using the first interlace index. For example, UE 105 can calculate the second interlace index based on the first interlace index and a number of interlaces for a sub-carrier spacing of the PUCCH.

According to some examples, the DCI can also include a mapping between Orthogonal Cover Code (OCC) index applied on an Uplink Control Information (UCI) symbol and a cyclic shift (CS) applied to a DeModulation Reference Signal (DMRS) symbol (for example, as discussed with respect to Table 1 above). In some examples, method 920 can further includes using the OCC Index to determine a CS index, generating the UCI symbol using the OCC index, and generating the DRMS symbol using the CS Index.

According to some examples, method 920 can further include determining a plurality of Orthogonal Cover Code (OCC) indices based on the received DCI and cycling the plurality of OCC indices across Physical Resource Blocks (PRBs) within an interlace.

According to some examples, method 920 can further include applying, based on the received DCI, a scrambling sequence per transmission to one or more symbols associated with the PUCCH.

According to some examples, method 920 can further include receiving System Information Block 1 (SIB1). The SIB1 can include a value configured to signal interlaced cell-specific PUCCH resource allocation to UE 105.

Figure 10A:
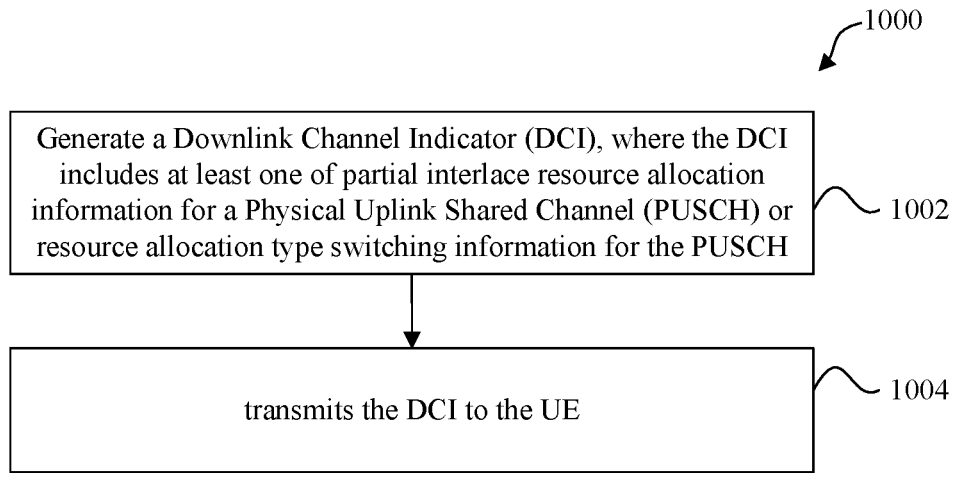
FIG. 10A illustrates an example method for a system (for example, a base station) supporting mechanisms for implementing resource allocation for partial interlaces PUSCH and/or resource allocation type switching, according to some aspects of the disclosure.

FIG. 10A illustrates an example method for a system (for example, a base station) supporting mechanisms for implementing resource allocation for partial interlaces PUSCH and/or resource allocation type switching, according to some aspects of the disclosure. As a convenience and not a limitation, FIG. 10A may be described with regard to elements of FIGS. 1, 5, 7, and 11. Method 1000 may represent the operation of an electronic device (for example, base station 101 of FIG. 1) implementing mechanisms for implementing resource allocation for partial interlaces PUSCH and/or resource allocation type switching. Method 1000 may also be performed by system 700 of FIG. 7 and/or computer system 1100 of FIG. 11. But method 1000 is not limited to the specific aspects depicted in those figures and other systems may be used to perform the method as will be understood by those skilled in the art. It is to be appreciated that not all operations may be needed, and the operations may not be performed in the same order as shown in FIG. 10A.

At 1002, a Downlink Channel Indicator (DCI) is generated. For example, base station 101 generates the DCI. In some examples, the DCI can include at least one of partial interlace resource allocation information for a Physical Uplink Shared Channel (PUSCH) or resource allocation type switching information for the PUSCH.

At 1004, base station 101 transmits the DCI to the UE.

According to some examples, the DCI includes a field to indicate a starting listen-to-talk (LBT) bandwidth and a number of contagiously allocated LBT bandwidths. Additionally, or alternatively, the field in the DCI can include a resource indication value (RIV) determined based on the starting LBT bandwidth, the number of contagiously allocated LBT bandwidths, and a number of LBT sub-bands within a bandwidth part (BWP).

In some examples, the DCI includes an allocation pattern. For example, an allocation pattern is discussed above with respect to Table 2. In some examples, the allocation pattern includes a bitmap, where a bit in the bitmap is set to a first value to indicate an LBT bandwidth not available for PUSCH transmission.

In some examples, a Most Significant Bit (MSB) of a frequency domain resource allocation (FDRA) field of the DCI includes the resource allocation type switching information, discussed, for example, with respect to equation (7). The MSB of the FDRA field of the DCI can be used to dynamically select one of two or more activated resource allocation schemes for PUSCH resource allocation at the UE.

According to some examples, the DCI further includes a Resource Indication Value (RIV). A first set of values for the RIV indicate contiguous interlaces resource allocation (RA), and wherein a second set of values for the RIV indicate non-contiguous interlaces RA.

Figure 10B:
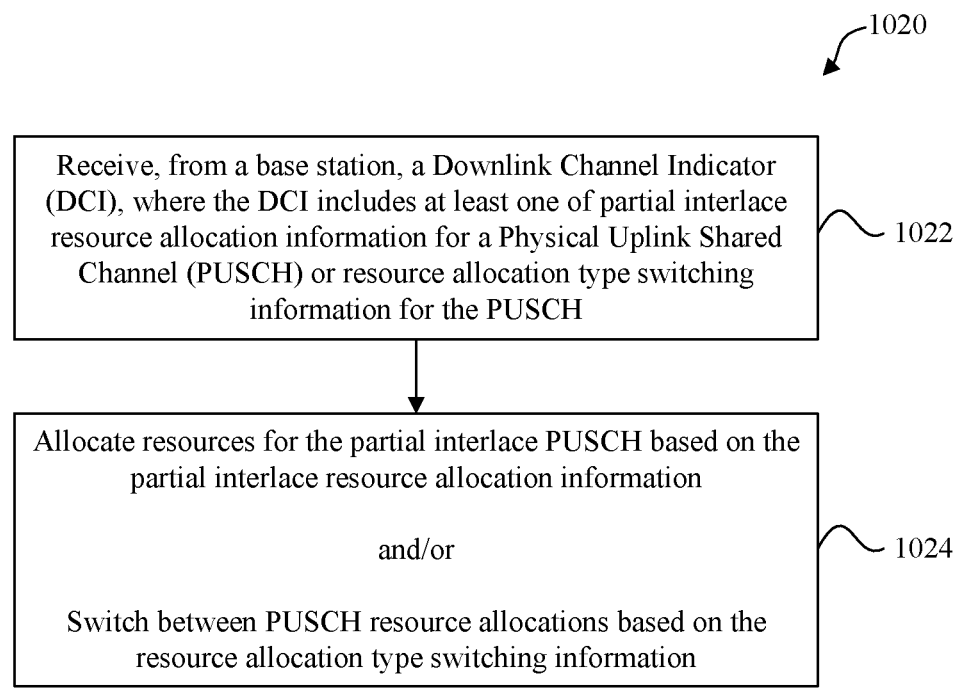
FIG. 10B illustrates an example method for a system (for example, a user equipment (UE)) supporting mechanisms for implementing resource allocation for partial interlaces PUSCH and/or resource allocation type switching, according to some aspects of the disclosure.

FIG. 10B illustrates an example method for a system (for example, a user equipment (UE)) supporting mechanisms for implementing resource allocation for partial interlaces PUSCH and/or resource allocation type switching, according to some aspects of the disclosure. As a convenience and not a limitation, FIG. 10B may be described with regard to elements of FIGS. 1, 5, 7, and 11. Method 1020 may represent the operation of an electronic device (for example, UE 105 of FIG. 1) implementing mechanisms for implementing resource allocation for partial interlaces PUSCH and/or resource allocation type switching. Method 1020 may also be performed by system 700 of FIG. 7 and/or computer system 1100 of FIG. 11. But method 1020 is not limited to the specific aspects depicted in those figures and other systems may be used to perform the method as will be understood by those skilled in the art. It is to be appreciated that not all operations may be needed, and the operations may not be performed in the same order as shown in FIG. 10B.

At 1022, a Downlink Channel Indicator (DCI) is received. For example UE 105 receives the DCI from base station 101. In some examples, the DCI can include at least one of partial interlace resource allocation information for a Physical Uplink Shared Channel (PUSCH) or resource allocation type switching information for the PUSCH.

At 1024, UE 105 can allocate resources for the partial interlace PUSCH based on the partial interlace resource allocation information. After allocating the resources, UE 105 can use the allocated resources for PUSCH transmission to, for example, base station 101. Additionally, or alternatively, UE 105 can dynamically switch between PUSCH resource allocations based on the resource allocation type switching information.

According to some examples, step 1024 can include using a field in the DCI to determine a starting listen-to-talk (LBT) bandwidth and a number of contagiously allocated LBT bandwidths. Additionally, or alternatively, step 1024 can include using the field in the DCI to determine a resource indication value (RIV). The RIV is determined based on the starting LBT bandwidth, the number of contagiously allocated LBT bandwidths, and a number of LBT sub-bands within a bandwidth part (BWP).

In some examples, the DCI includes an allocation pattern. For example, an allocation pattern is discussed above with respect to Table 2. In some examples, the allocation pattern includes a bitmap, where a bit in the bitmap is set to a first value to indicate an LBT bandwidth not available for PUSCH transmission. Step 1024 can further include detecting the allocation pattern in the DCI and using the allocation patter to allocate the resources for the partial interlace PUSCH.

In some examples, step 1024 can include inspecting and/or detecting a Most Significant Bit (MSB) of a frequency domain resource allocation (FDRA) field of the DCI to determine the resource allocation type switching information, discussed, for example, with respect to equation (7). In other words. UE 105 can use the MSB of the FDRA field of the DCI to dynamically select one of two or more activated resource allocation schemes for PUSCH resource allocation.

According to some examples, method 1020 can further include using the received DCI to determine whether to use contiguous interlaces resource allocation to non-contiguous interlaces resource allocation. For example, the received DCI further includes a Resource Indication Value (RIV). A first set of values for the RIV indicate contiguous interlaces resource allocation (RA), and wherein a second set of values for the RIV indicate non-contiguous interlaces RA. In this example, method 1020 can include determining RIV from the received DCI and comparing the value of the RIV to a first set of values. If the value of the RIV is in the first set of values, UE 105 uses contiguous interlaces resource allocation (RA). If the value of the RIV is not in the first set of values. UE uses non-contiguous interlaces resource allocation (RA). Alternatively, if the value of the RIV is not in the first set of values, method 1020 can include comparing the value of the RIB with a second set of value. If the value of the RIV is in the second set of values, UE uses non-contiguous interlaces resource allocation (RA). In some examples, base station 101 can communicate the first and/or second set of values to UE 105 using RRC message(s), DCI, or other signaling(s).

Figure 11:
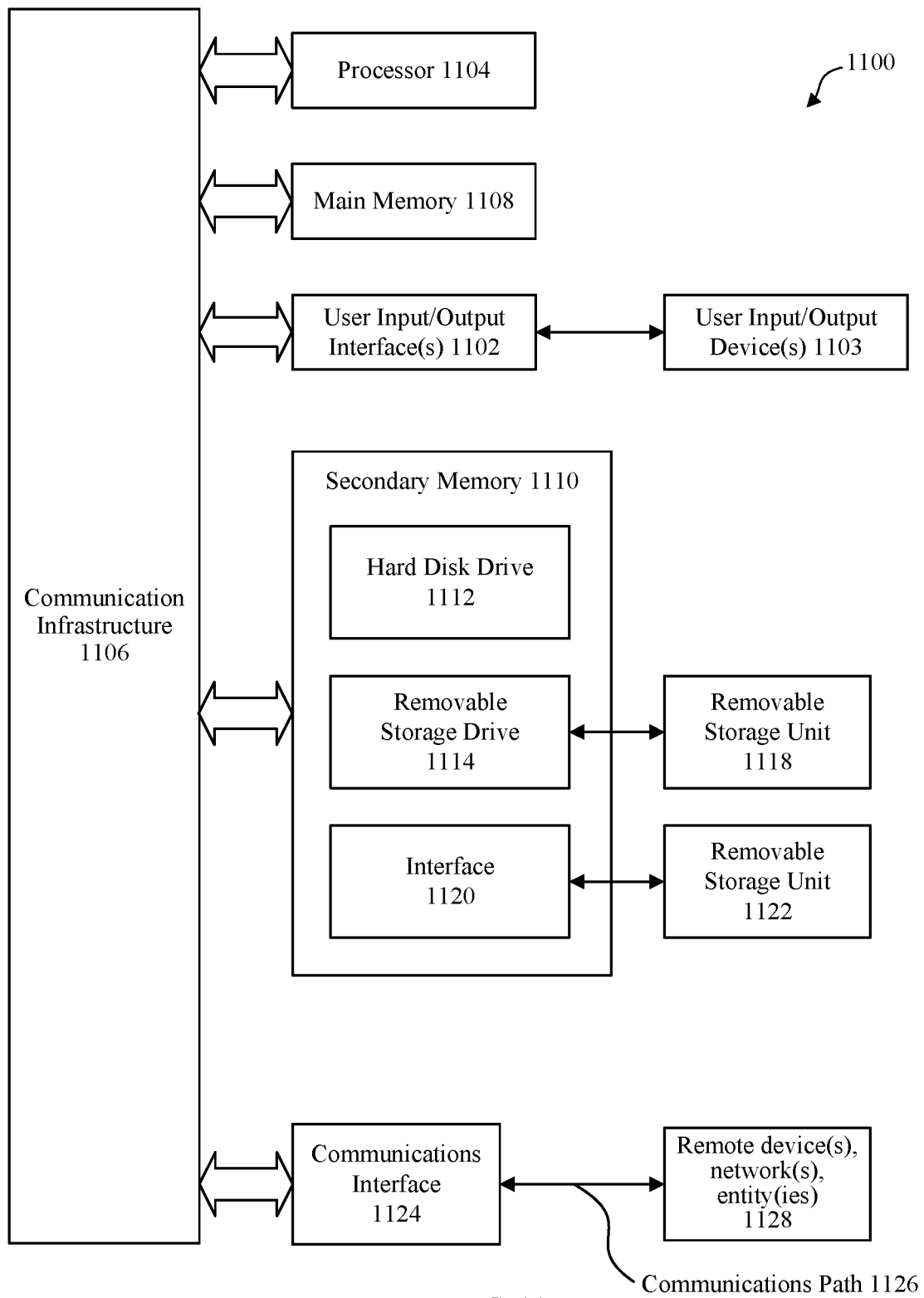
FIG. 11 is an example computer system for implementing some aspects or portion(s) thereof.

Various aspects can be implemented, for example, using one or more computer systems, such as computer system 1100 shown in FIG. 11. Computer system 1100 can be any well-known computer capable of performing the functions described herein such as devices 101, 105 of FIG. 1, or 700 of FIG. 7. Computer system 1100 includes one or more processors (also called central processing units, or CPUs), such as a processor 1104. Processor 1104 is connected to a communication infrastructure 1106 (e.g., a bus.) Computer system 1100 also includes user input/output device(s) 1103, such as monitors, keyboards, pointing devices, etc., that communicate with communication infrastructure 1106 through user input/output interface(s) 1102. Computer system 1100 also includes a main or primary memory 1108, such as random access memory (RAM). Main memory 1108 may include one or more levels of cache. Main memory 1108 has stored therein control logic (e.g., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner.

According to some aspects, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1100, main memory 1108, secondary memory 1110 and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 11. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "aspects" "an example," "examples," or similar phrases, indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A base station, comprising:
    a transceiver configured to wirelessly communicate with a user equipment (UE); and
    a processor communicatively coupled to the transceiver and configured to:
        generate a Downlink Channel Indicator (DCI), wherein the DCI comprises interlace resource allocation information for a Physical Uplink Control Channel (PUCCH) and a mapping between an Orthogonal Cover Code (OCC) index applied on an Uplink Control Information (UCI) symbol and a cyclic shift applied to a DeModulation Reference Signal (DMRS) symbol; and
        transmit, using the transceiver, the DCI to the UE.

2. The base station of claim 1, wherein the interlace resource allocation information for the PUCCH comprises a bitmap, wherein a first value of a bit of the bitmap indicates that a corresponding interlace resource is allocated for the PUCCH.

3. The base station of claim 2, wherein a size of the bitmap is based on a sub-carrier spacing of the PUCCH.

4. The base station of claim 1, wherein the interlace resource allocation information for the PUCCH comprises a first interlace index and wherein a second interlace index is calculated by the UE using the first interlace index.

5. The base station of claim 4, wherein the second interlace index is based on the first interlace index and a number of interlaces for a sub-carrier spacing of the PUCCH.

6. The base station of claim 1, wherein the PUCCH comprises at least one of PUCCH Format 2 or PUCCH Format 3.

7. The base station of claim 1, wherein the DCI further comprises information for the UE to cycle one or more OCC indices across one or more Physical Resource Blocks (PRBs) within an interlace.

8. The base station of claim 1, wherein the DCI further comprises information for the UE to apply a scrambling sequence per transmission to one or more symbols associated with the PUCCH.

9. The base station of claim 1, wherein the processor is further configured to generate System Information Block 1 (SIB1), wherein the SIB1 comprises a value configured to signal interlaced cell-specific PUCCH resource allocation to the UE.

10. A user equipment (UE), comprising:
    a transceiver configured to wirelessly communicate with a base station; and
    a processor communicatively coupled to the transceiver and configured to:
        receive, from the base station, a Downlink Channel Indicator (DCI), wherein the DCI comprises interlace resource allocation information for a Physical Uplink Control Channel (PUCCH) and information for the UE to cycle one or more Orthogonal Cover Code (OCC) indices across one or more Physical Resource Blocks (PRBs) within an interlace; and
allocate resources on the PUCCH based on the interlace resource allocation information.

11. The UE of claim 10, wherein the interlace resource allocation information for the PUCCH comprises a bitmap, wherein a first value of a bit of the bitmap indicates that a corresponding interlace resource is allocated for the PUCCH.

12. The UE of claim 10, wherein the interlace resource allocation information for the PUCCH comprises a first interlace index and wherein the processor is further configured to calculate a second interlace index using the first interlace index.

13. The UE of claim 12, wherein the second interlace index is based on the first interlace index and a number of interlaces for a sub-carrier spacing of the PUCCH.

14. The UE of claim 10, wherein the interlace resource allocation information for the PUCCH comprises a bitmap, wherein a first value of a bit of the bitmap indicates that a corresponding interlace resource is allocated for the PUCCH, and wherein a size of the bitmap is based on a sub-carrier spacing of the PUCCH.

15. The UE of claim 10, wherein the DCI further comprise a mapping between an OCC index applied on an Uplink Control Information (UCI) symbol and a cyclic shift applied to a DeModulation Reference Signal (DMRS) symbol.

16. The UE of claim 10, wherein the DCI further comprises information for the UE to apply a scrambling sequence per transmission to one or more symbols associated with the PUCCH.

17. A method, comprising:
receiving, by a user equipment (UE) and from a base station, a Downlink Channel Indicator (DCI), wherein the DCI comprises interlace resource allocation information for a Physical Uplink Control Channel (PUCCH) and information for the UE to apply a scrambling sequence per transmission to one or more symbols associated with the PUCCH; and
allocating resources on the PUCCH based on the interlace resource allocation information.

18. The method of claim 17, wherein the interlace resource allocation information comprises a first interlace index and the method further comprises calculating a second interlace index using the first interlace index.

19. The method of claim 17, wherein the interlace resource allocation information for the PUCCH comprises a bitmap, wherein a first value of a bit of the bitmap indicates that a corresponding interlace resource is allocated for the PUCCH.

20. The method of claim 19, wherein a size of the bitmap is based on a sub-carrier spacing of the PUCCH.

* * * * *